United States Patent
Koresawa et al.

(10) Patent No.: US 7,593,003 B2
(45) Date of Patent: Sep. 22, 2009

(54) IMAGE PROCESSING UNIT, METHOD, AND PROGRAM

(75) Inventors: Akio Koresawa, Kanagawa (JP); Tetsuro Kida, Kanagawa (JP); Yasuo Nomura, Kanagawa (JP); Mitsuru Nagasaka, Tokyo (JP); Tomoe Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 725 days.

(21) Appl. No.: 10/994,874

(22) Filed: Nov. 22, 2004

(65) Prior Publication Data
US 2005/0114886 A1    May 26, 2005

(30) Foreign Application Priority Data
Nov. 25, 2003   (JP)   ............................ P2003-393869

(51) Int. Cl.
G09G 5/00    (2006.01)
(52) U.S. Cl. .......................... 345/173; 345/156; 725/39; 725/44
(58) Field of Classification Search ................. 345/173; 725/39, 44, 46, 52; 715/716, 719, 856–858
See application file for complete search history.

(56) References Cited

U.S. PATENT DOCUMENTS

| 5,659,350 A * | 8/1997 | Hendricks et al. ............ 725/116 |
| 6,177,931 B1 * | 1/2001 | Alexander et al. ............ 725/52 |
| 2003/0025676 A1 * | 2/2003 | Cappendijk ................. 345/173 |

FOREIGN PATENT DOCUMENTS

JP    2000-307967    11/2000

* cited by examiner

*Primary Examiner*—Richard Hjerpe
*Assistant Examiner*—Mansour M Said
(74) *Attorney, Agent, or Firm*—Finnegan, Henderson, Farabow, Garrett & Dunner, L.L.P.

(57) ABSTRACT

A display of "scroll up by 1 hour" is overlaid on sections of station name of a program schedule Fa1 when an up arrow key of a cross key provided to a remote commander is operated when a cursor K is on the upper border of a program frame, and when there is any preceding program (past program) not currently displayed in the program schedule Fa1. Then when an enter key provided to the remote commander is operated, the 1-hour-scrolled-up program schedule Fa1 is responsively displayed after reconfiguration. In such a manner, the display range of the program schedule can be changed with ease, and the present invention is applicable to television receivers for digital broadcasting.

7 Claims, 35 Drawing Sheets

FIG. 1

| AUGUST 15 (FRI), 1997 | ⇩ ⇧ | REGION A ▷ | | |
|---|---|---|---|---|
| | [4] AA STATION | [6] BB STATION | [8] CC STATION | |
| 6 | 00 ××NEWS [NEWS][WEATHER] | 00 NEWS [WEATHER] | 00 TALK SHOW [NEWS][WEATHER] | |
| 7 | 00 COMEDY | 00 DOCUMENTARY | 00 NIGHT BASEBALL | |
| 8 | 00 GAME | 55 [NEWS] | | |
| 9 | 00 ☐ REPORT | 00 QUIZ SHOW | 00 CARTOON | |

SB (top), SB (right scrollbar)

IMAGE PROCESSING UNIT, METHOD, AND PROGRAM

BACKGROUND OF THE INVENTION

The present invention relates to image processing units, methods, and programs and, more specifically, to an image processing unit, method, and program with which program schedules can be changed with ease in terms of their display range.

DESCRIPTION OF THE RELATED ART

In recent years, digital broadcasting is becoming popular for transmission of program data of a plurality of channels. In digital broadcasting, program data is subjected to processes of compression and decompression, and multiplexing using MPEG-2 (Moving Picture Experts Group 2), thereby achieving simultaneous transmission of a huge number of programs. This accordingly increases the program availability for users to a considerable degree.

To deal with such a resulting large number of programs in digital broadcasting, information data is provided for users' use as a basis for selecting which program to view. Such data is referred to as EPG (Electronic Program Guide). The EPG is compiled through multiplexing with the program data, and the users acquire the EPG through separation therebetween. Alternatively, the EPG can be derived over the Internet from a service server providing program schedules responding to the users' requests.

FIG. 1 shows an exemplary program schedule displayed based on the EPG (refer to JP-A-2000-307967 (Patent Document 1)). The program schedule is the one displayed on users' television receivers, personal computers, and the like. Similarly to television (TV) program guides on newspapers, the program schedule includes sections of time, station name, and program. The time sections are columns for the broadcasting time, the station name sections are rows for broadcasting station names, and program sections cover the program details, telling what program will be on the air at what time by which broadcasting station.

The program schedule is provided with scroll bars SB to scroll the program details along the time sections and the station name sections, respectively.

Through operation of these scroll bars SB, the users change the display range of the program schedule as they want, and find programs of a desired time range or broadcasting station.

SUMMARY OF THE INVENTION

The issue here is that, for changing the display range of the program schedule using the scroll bars SB as such, the users are supposed to be accustomed to a certain level to scrolling the scroll bars SB. If not accustomed enough, the users may scroll the bars too much or may not scroll the bars enough, thereby failing to display the program schedule of their wanting range.

The invention is proposed in consideration of the above, and an object thereof is to enable easy display of a program schedule covering any required range.

The invention is directed to an image processing unit including display means for displaying a display option to be selected for display determination in response to a request for displaying display data of a part that is not currently displayed on a display screen as screen data, and reconfiguration means for reconfiguring, after a selection is made for the display option, the screen data to include the requested part of the display data.

The display data may be an electronic program guide composed of blocks each designated for a predetermined section.

The block section may indicate channel number, broadcasting station name, broadcasting time, date and time, or category.

When a cursor is moved in the direction beyond the displayed screen data, the display means displays the display option with a determination that the display data of a part not currently displayed is requested.

The display option may be changed in display color when selected.

The display option may flash when selected.

The display option may be plurally provided to allow users to select how many blocks of the display data of a part not currently displayed as the screen data to scroll.

The display means may display a display option to be selected for determining a display format of the screen data when the cursor is moved in the direction beyond the displayed screen data, and the reconfiguration means reconfigures the screen data to be displayed in the display format in accordance with the selected display option.

The invention is also directed to an image processing method including a display step of displaying a display option to be selected for display determination in response to a request for displaying display data of a part not currently displayed on a display screen as screen data, and a reconfiguration step of reconfiguring, after a selection is made for the display option, the screen data to include the requested part of the display data.

The invention is also directed to a computer-executable program including a display control step of displaying a display option to be selected for display determination in response to a request for displaying display data of a part not currently displayed on a display screen as screen data, and a reconfiguration control step of reconfiguring, after a selection is made for the display option, the screen data to include the requested part of the display data.

With the image processing unit, method, and program of the invention, when a request comes for displaying display data of a part not currently displayed on a display screen as screen data, a display option is displayed for selection at the time of display determination, and after a selection is made for the display options, the screen data is so reconfigured as to include the requested part of the display data.

BRIEF DESCRIPTION OF THE DRAWINGS

FIG. 1 is a diagram showing an exemplary conventional program schedule;

DESCRIPTION OF THE PREFERRED EMBODIMENT

In the below, an embodiment of the invention is described. Herein, to explicate the correspondence between the following embodiment and means set forth in claims of the invention, the respective means are accompanied with their each corresponding exemplary embodiment in parentheses to describe the characteristics of the invention. Surely, such description does not restrict the means to their exemplary embodiment.

The term "display data" as used herein means data to be displayed on a display. The display data may be of a size smaller than, equal to, or larger than a display screen size of the display. The term "screen data" as used herein means data that is a part or the whole of the display data and has a size corresponding to the display screen size of the display. The screen data includes the whole display data when the display screen size of the display data is smaller than that of, or equal to, the display screen size of the display. On the other hand, the screen data includes a part of the display data corresponding to the display screen size of the display when the display screen size of the display data is larger than that of the display screen size.

Figure 3:
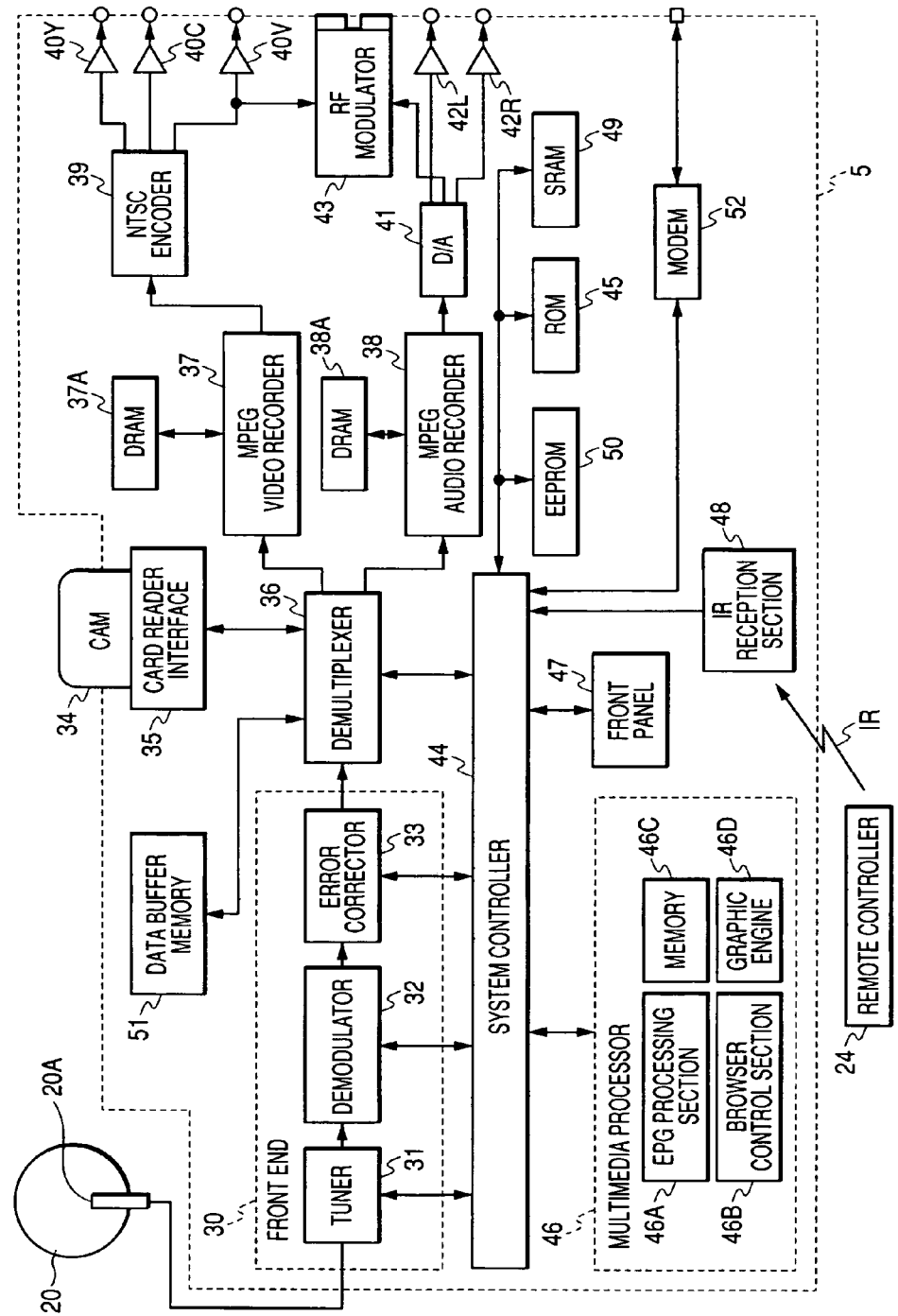
FIG. 3 is a block diagram showing an exemplary structure of a receiver of FIG. 1.
Figure 10:
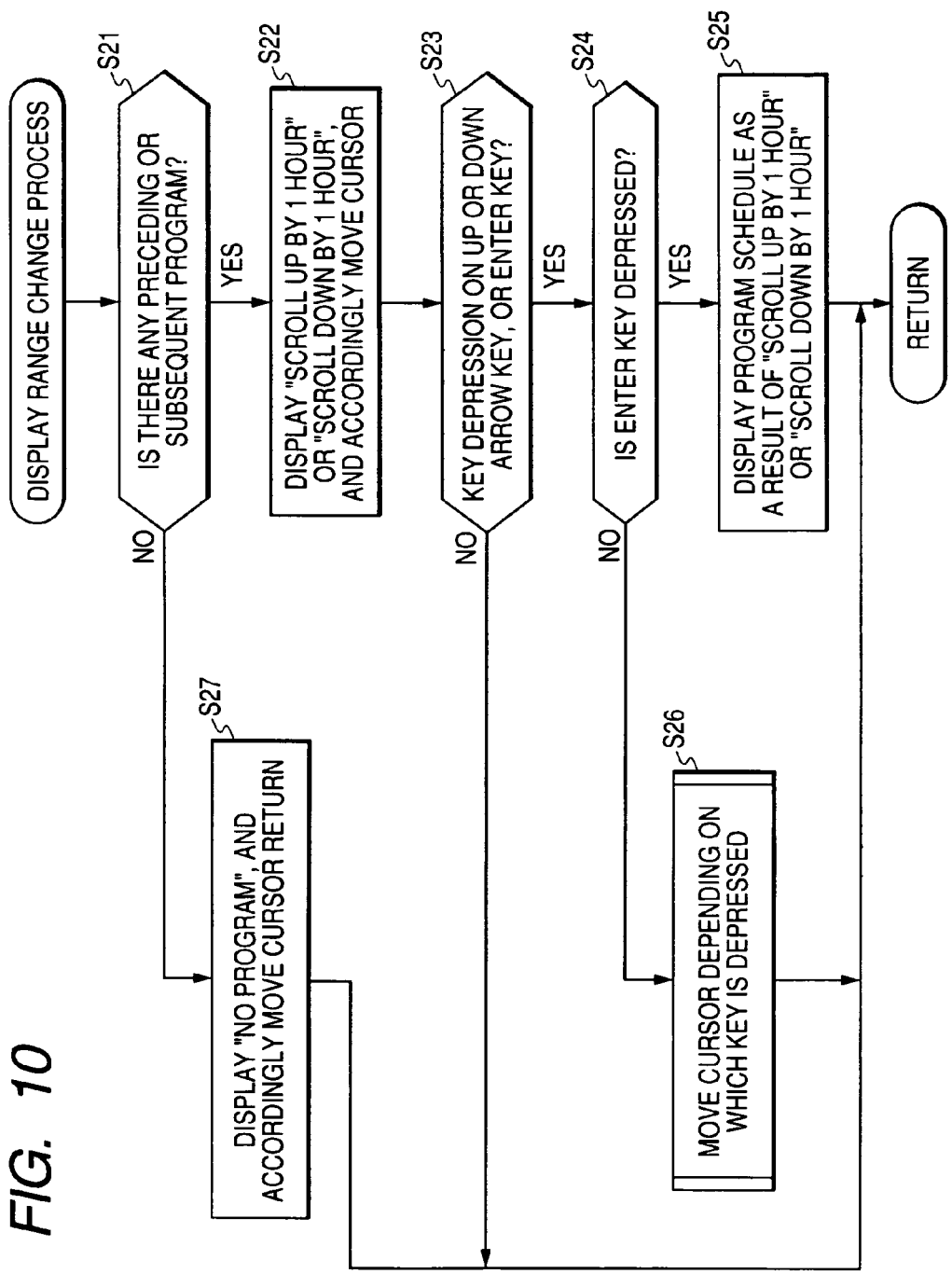
FIG. 10 is a flowchart illustrating another operation of the receiver of FIG. 1.
Figure 29:
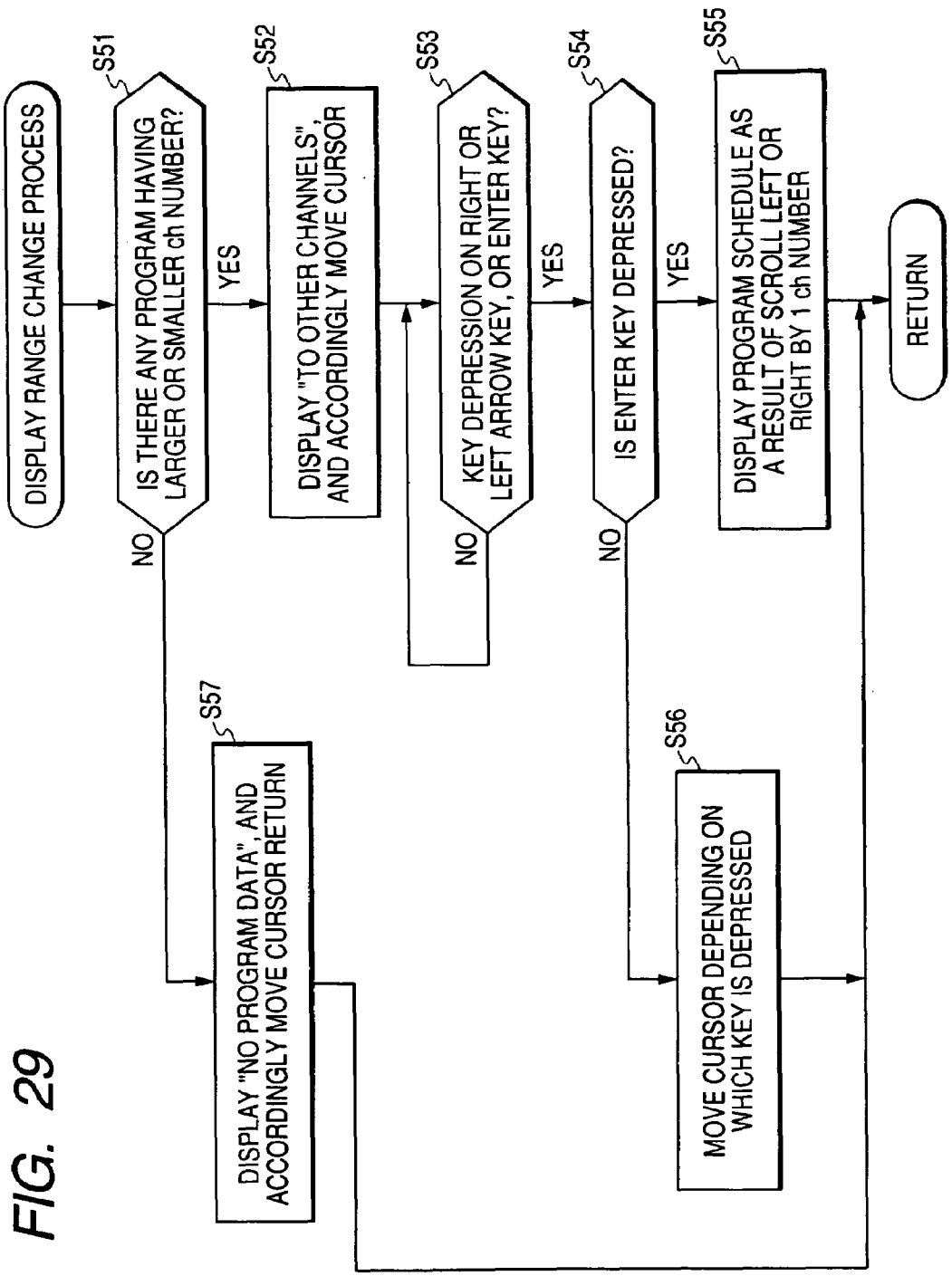
FIG. 29 a flowchart illustrating still another operation of the receiver of FIG. 1.

An image processing unit of the invention is provided with display means (e.g., processor 46 of FIG. 3 going through step S22 of FIG. 10), and reconfiguration means (e.g., processor 46 of FIG. 3 going through step S25 of FIG. 10 or step S55 of FIG. 29). Specifically, the display means displays a display option (e.g., display Ga or Gb of FIG. 11 or 12) to be selected for display determination responding to a request asking for displaying display data of a part not displayed on a display screen as screen data. The reconfiguration means reconfigures the screen data so as to include the requested part of the display data.

When a cursor (e.g., cursor K of FIG. 8 or 9) is moved in the direction beyond the displayed screen data (e.g., step S2 of FIG. 6), the display means determines that any specific part of the display data not currently displayed is requested for display, and accordingly displays the corresponding display option.

Figure 13:
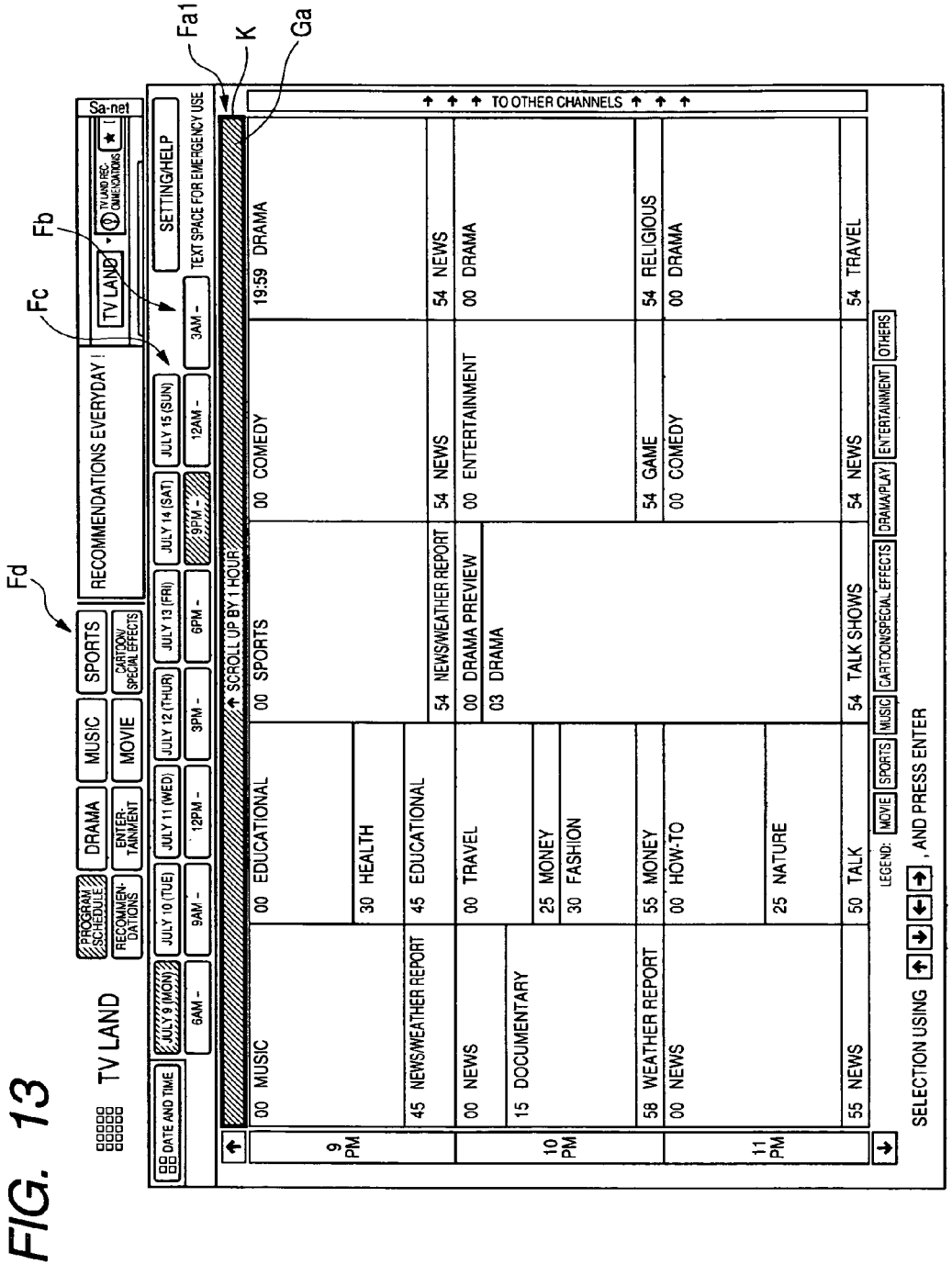
FIG. 13 is a diagram showing still another exemplary EPG screen.
Figure 14:
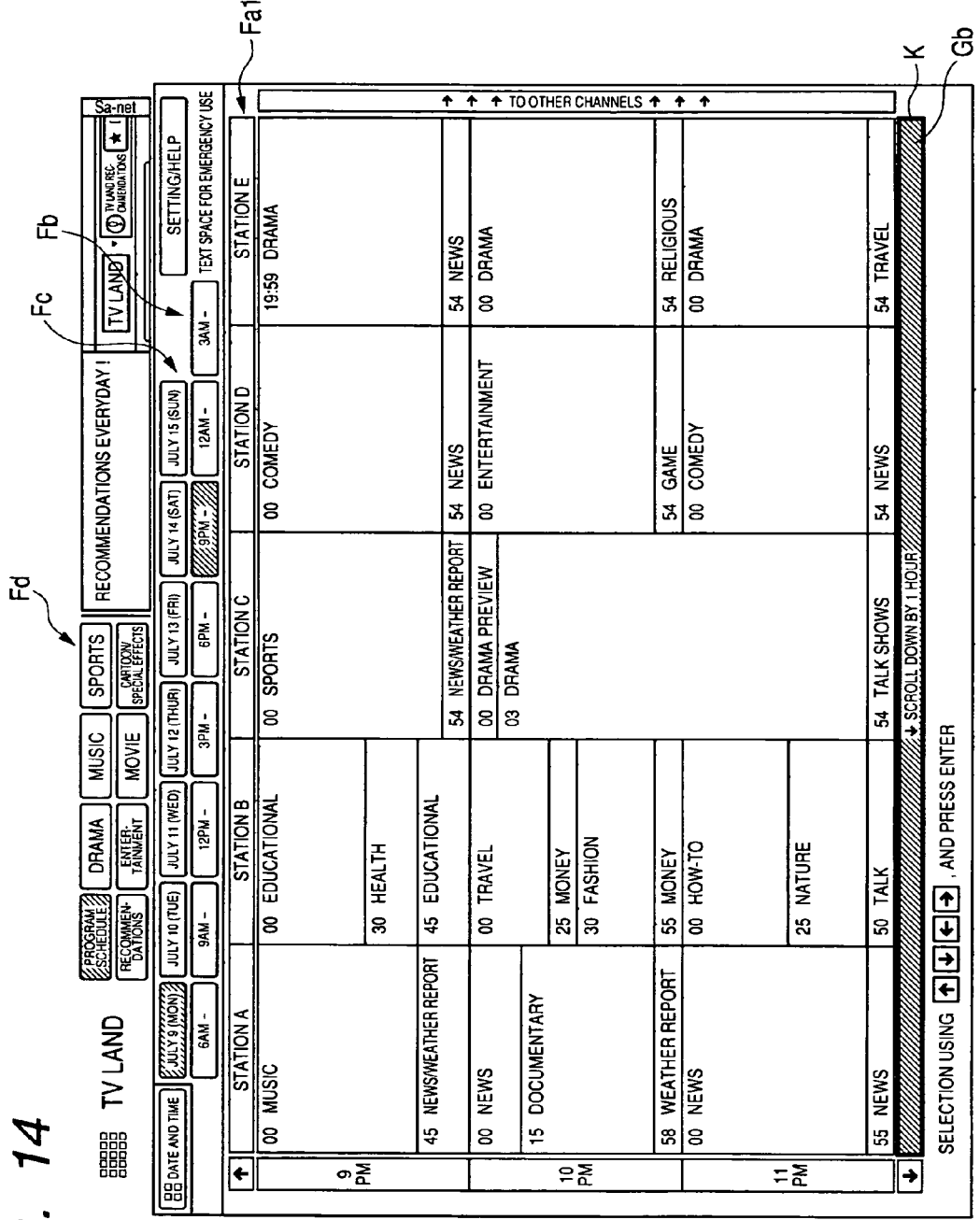
FIG. 14 is a diagram showing still another exemplary EPG screen.

The display option may change in display color or flash when selected (e.g., display Ga or Gb of FIG. 13 or 14).

Figure 23:
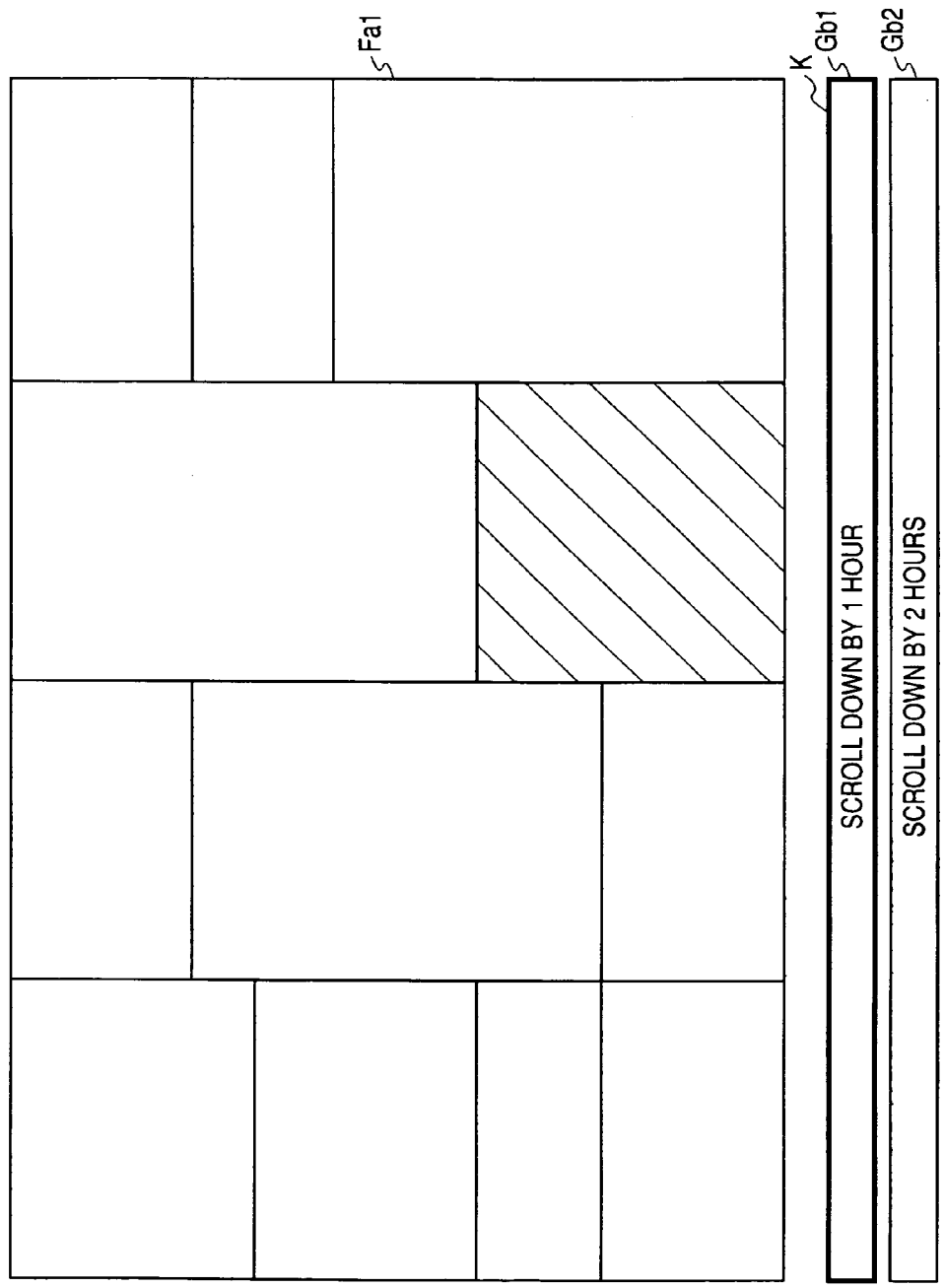
FIG. 23 is a diagram showing still another exemplary EPG screen.

The display option may be plurally provided to allow users to select how many blocks of the display data of a part not currently displayed as the screen data to scroll (e.g., display options of Gb1 and Gb2 of FIG. 23).

Figure 32:
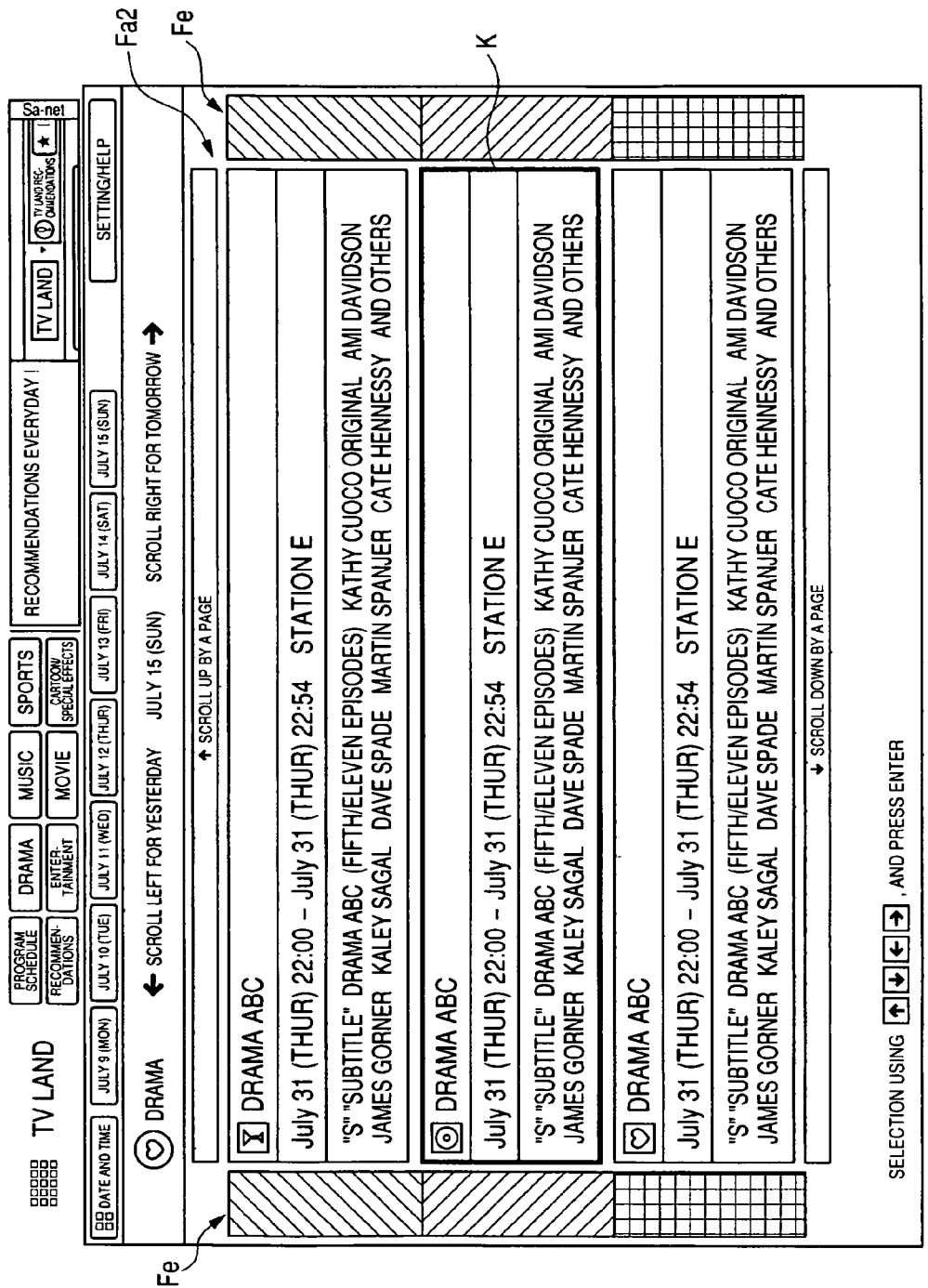
FIG. 32 is a diagram showing still another exemplary EPG screen.

If the cursor is moved in the direction beyond the displayed screen data, the display means accordingly displays a display option that to be selected for determination of screen data display format (e.g., link buttons Gb of FIG. 32). The reconfiguration means accordingly reconfigures the screen data to fit in the determined display format.

An image processing method of the invention is characterized in including a display step (e.g., step S2 of FIG. 6), and a reconfiguration step (e.g., step S25 of FIG. 10, or step S55 of FIG. 29). Specifically, the display step displays a display option to be selected for display determination responding to a request asking for displaying display data of a part not currently displayed on a display screen as screen data. The reconfiguration step reconfigures the screen data so as to include the requested part of the display data.

Figure 2:
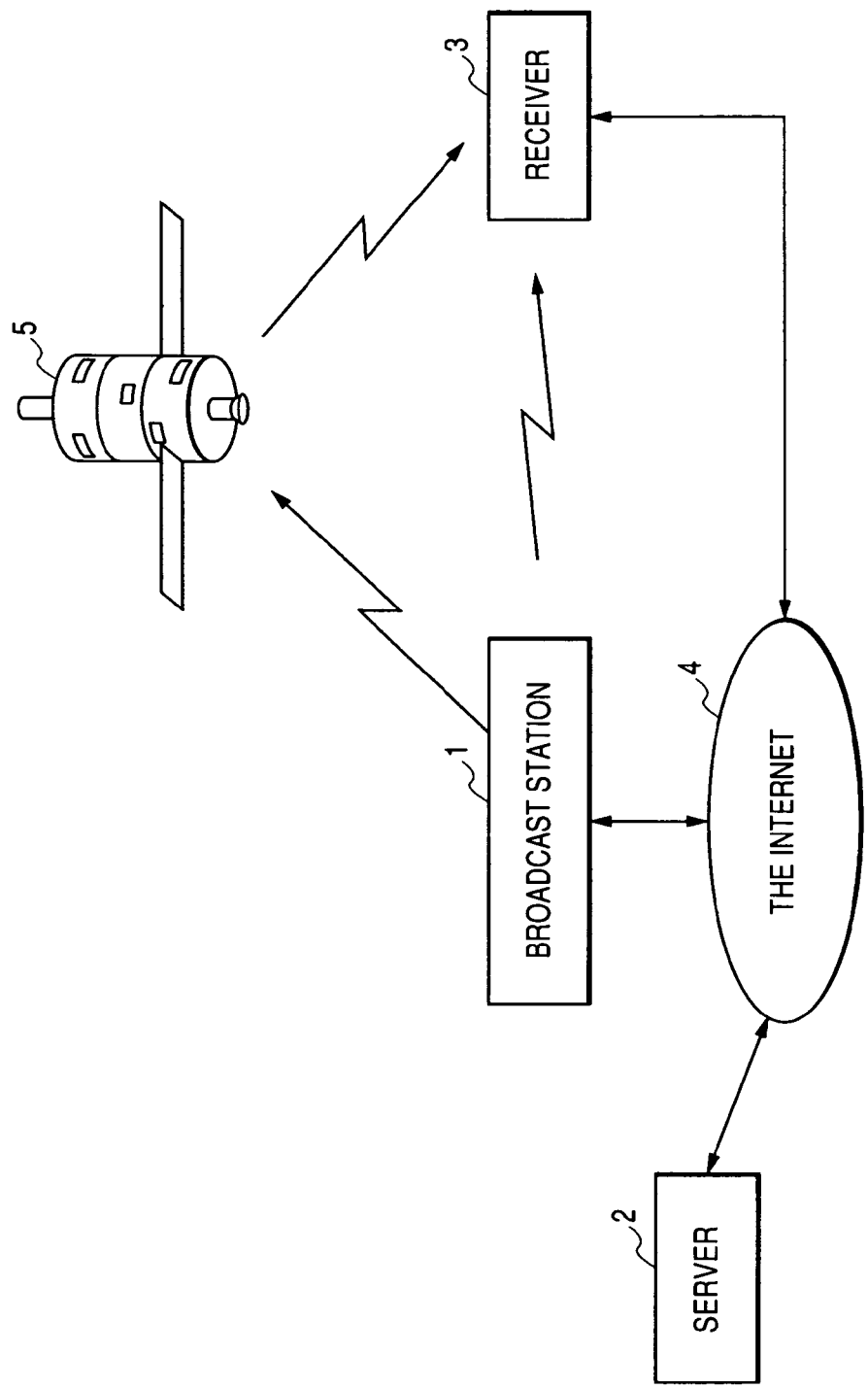
FIG. 2 is a diagram showing an exemplary digital broadcasting system.

FIG. 2 shows an exemplary structure of a broadcasting system.

A broadcasting station 1 transmits TV programs and EPG of a plurality of channels by an MPEG-2 transport stream. Such a transmission is carried out via a satellite 5 or terrestrially.

A server 2 transmits the EPG of programs to be broadcast by the broadcasting station 1 to a receiver 3 over the Internet 4.

Out of the transport stream received via the satellite 5 or terrestrially, the receiver 3 performs extraction of transport packet for the program data and EPG of any desired channel. Thereafter, based on video and audio data found in thus extracted transport packets, the receiver 3 applies a display process to the programs and the EPG. The receiver 3 also goes through another display process for the EPG provided by the server 2.

FIG. 3 is an exemplary structure of the receiver 3.

An LNB (Low Noise Block downconverter) 20A of a dish antenna 20 receives broadcast waves for supply to a front end 30. Herein, the broadcast waves are overlaid with the EPG and others in accordance with any defined format.

The front end 30 is provided with a tuner 31, a demodulator 32, and an error corrector 33, those of which are under the control of a system controller 44. The broadcast waves received by the antenna 20 are forwarded to the tuner 31 of the front end 30.

The tuner 31 goes through a tuning process responding to the control executed by the system controller 44. The output of the tuner 31 goes to the demodulator 32 for demodulation therein. The output of the demodulator 32 goes to the error corrector 33 for error detection and correction, and if required, error compensation.

A CAM (Conditional Access Module) 34 is structured by a CPU (Central Processing Unit), and an IC card including ROM (Read Only Memory) and RAM (Random Access Memory), and stores a decryption key together with a decryption program. This decryption key is required for decryption if any incoming signals are encrypted.

A demultiplexer 36 reads the decryption key from the CAM 34 over a card reader interface 35 for use to decrypt the encrypted signals. The demultiplexer 36 receives signals coming from the error corrector 33 of the front end 30, and stores the signals temporarily in data buffer memory 51 including DRAM (Dynamic Random Access Memory) or SRAM (Static Random Access Memory) for signal reading as required. Out of the read signals, video signals are provided to an MPEG video decoder 37, and audio signals to an MPEG audio decoder 38.

The demultiplexer 36 captures the EPG not including MPEG video and audio data from the front end 30 for supply to the system controller 44.

The MPEG video decoder 37 stores the digital video signals provided from the demultiplexer 36 into DRAM 37A, and applies a decoding process to those video signals having been compressed under the MPEG. Thus decoded video signals are each forwarded to an NTSC encoder 39 for conversion into a luminance signal (Y), a chroma signal (C), and a composite signal (V) of the NTSC. The luminance signal (Y) and the chroma signal (C) are both output as video signals through buffer amplifiers 40Y and 40C. The composite signal (V) is output as a buffer amplifier 40V.

The MPEG audio decoder 38 stores the digital audio signals provided from the demultiplexer 36 into DRAM 38A, and applies the decoding process to those audio signals having been compressed under the MPEG. Thus decoded audio signals are forwarded to a D/A converter 41 for digital-analog conversion therein. The audio signals of a left channel are output via a buffer amplifier 42L, and the audio signals of a right channel are output via a buffer amplifier 42R.

An RF modulator 43 converts, into RF signals, the composite signal coming from the NTSC encoder 39 and the audio signal from the D/A converter 41 for output.

The system controller 44 executes various processes in accordance with a program stored in the ROM 45.

Toward the system controller 44, an operation button switch (not shown) provided to a front panel 47 is operated to directly input any given commands. Through operation of an operation key of a remote commander 24, an infrared signal is issued from an IR transmission section of the remote commander 24. This infrared signal is then received by an IR reception section 48 so that the reception result is forwarded to the system controller 44. In this manner, any given commands can be input to the system controller 44 also through operation of the remote commander 24.

A multimedia processor 46 (in the below, simply referred also to as processor 46 as appropriate) is structured by an EPG processing section 46A, a browser control section 46B, memory 46C, a graphic engine 46D, and the like. The multimedia processor 46 is in charge of data generation for screen display such as program schedules, and goes through an HTML (HyperText Markup Language) process with internally-equipped browser software of the Internet 4.

The EPG is composed of a plurality of blocks each designated for channel number, broadcasting station name, broadcasting time, date and time, program title, category, and others. The EPG comes frequently so that the memory 46C of the multimedia processor 46 always carry the latest EPG data.

The EPG processing section 46A performs block extraction in a corresponding manner to the displayed screen laid out based on screen layout data. Such block extraction is made from the EPG stored in the memory 46C, and used as a basis for creating screen data of a given format.

The resulting screen data is written into the DRAM 37A in the bitmap format. Thus written screen data is processed by the MPEG video decoder 37 for display.

Figure 4:
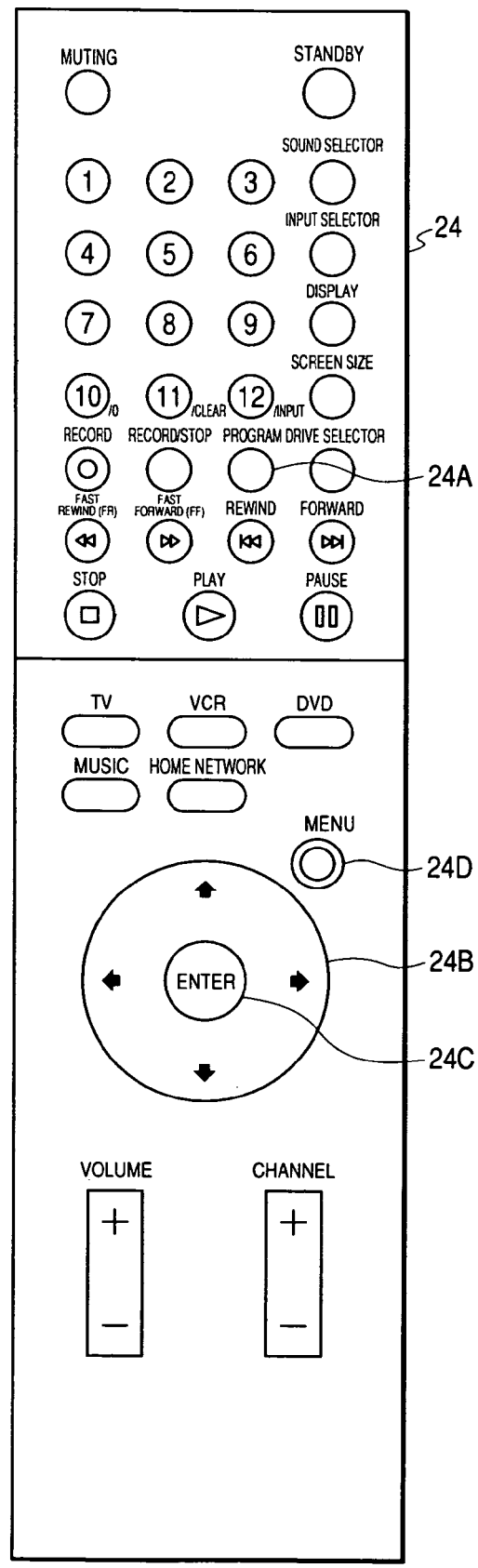
FIG. 4 is a diagram showing an exemplary outer structure of a remote commander of FIG. 3.
Figure 5:
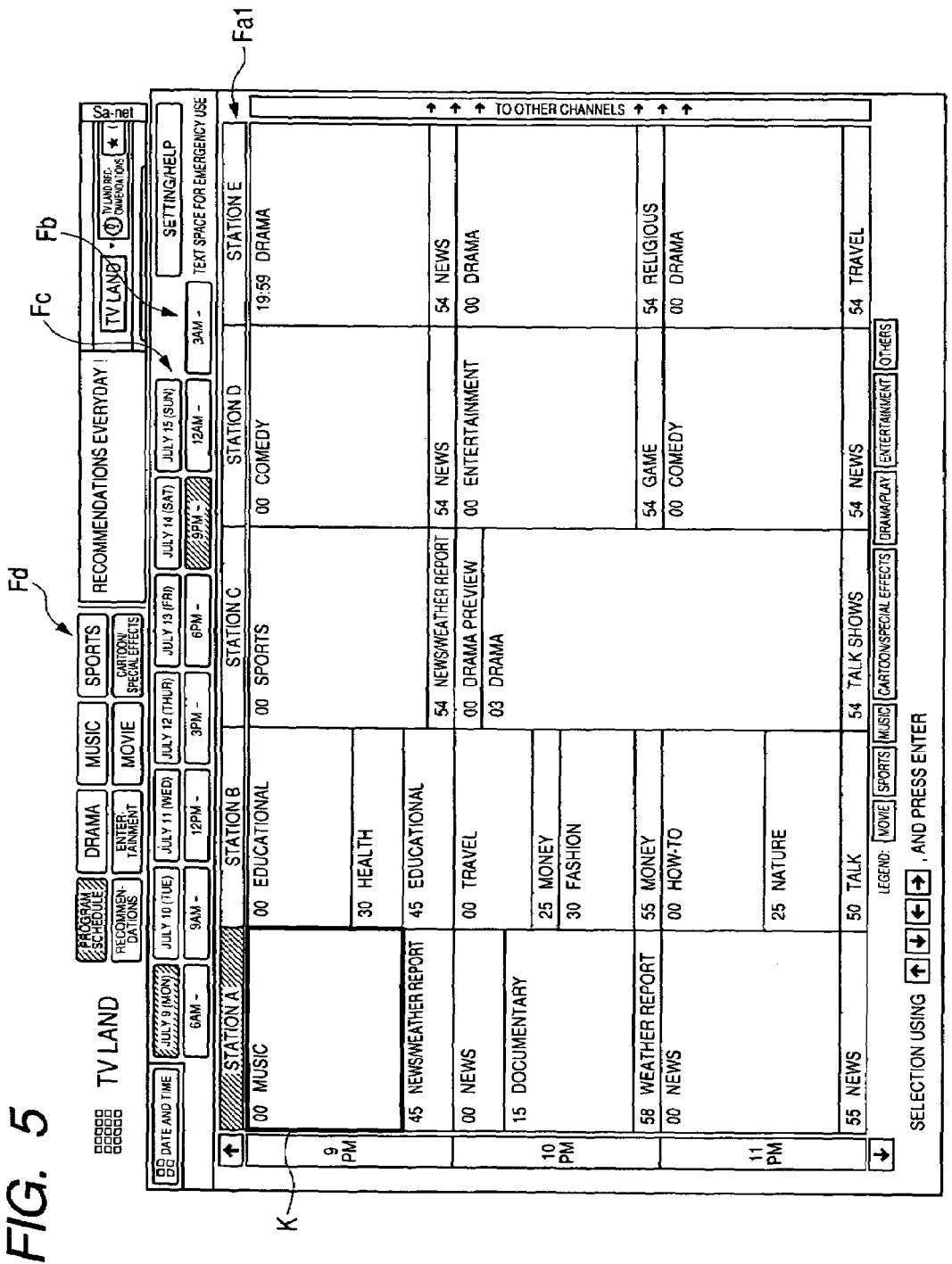
FIG. 5 is a diagram showing an exemplary EPG screen.

In this example, in response to the operation of a "program schedule" button 24A of the remote commander 24 of FIG. 4, the processor 46 lays out a program schedule Fa1 as shown in FIG. 5, including sections of time, broadcasting station name, and program. More in detail, the program schedule Fa1 includes the EPG for a day covering all broadcasting stations receivable for an area, e.g., information relevant to programs of 5 channels in increasing order of station number for the subsequent 3 hours.

The EPG screen includes shortcut buttons Fb for changing the beginning time of the time range to be covered by the program schedule Fa1, and shortcut buttons Fc for changing the date and time. The program schedule Fa1 of FIG. 5 covers the programs to be on the air at 9 PM and onward on Monday, July 9, and thus, the button Fc of "July 9 (Mon)" and the button Fb of "9 PM-" are highlighted (shaded).

In the EPG screen, the programs are displayed by category, including drama, music, sports, recommendations, entertainment, movie, cartoon/special effects, and others. To deal with program display categorized as such, the EPG screen is provided with link buttons Fd for changing the display format of the program contents. In FIG. 5 example, as the program schedule Fa1 is displayed, the link button Fd of "program schedule" is highlighted (shaded) therein.

The EPG screen also includes a cursor K that moves responsively to a cross key 24B of the remote commander 24 if operated.

The remote commander 24 includes a "menu" button 24D, and if the menu button 24D is operated during when the program schedule Fa1 is displayed, the following menus appear responsively. This allows the users to select any given menu in consideration of the available function.

menu for closing menu display
menu for updating the program schedule Fa1 to the latest
menu for putting the program schedule Fa1 back to the one immediately after the "program schedule" button 24A is operated
help menu for operating the program schedule Fa1 using a remote commander
menu for displaying the version number of remote-controlled EPG application
menu for closing EPG screen Referring back to FIG. 3, the browser control section 46B creates bitmap data of a home page based on the HTML data coming from a WWW server on the Internet 4 through a modem 52 and the system controller 44 connected to a telephone circuit. Thus created bitmap data is supposed to be written into the DRAM 37A. The display data after writing to the DRAM 37A is processed by the MPEG video decoder 37 for display.

As such, by processing the bitmap data of the EPG screen and the home page, the EPG processing section 46A and the browser control section 46B can go through a display process to allow browsing of the EPG screen and the home page.

SRAM 49 is used as working memory of the system controller 44. The modem 52 forwards and receives data through the telephone circuit under the control of the system controller 44.

Figure 6:
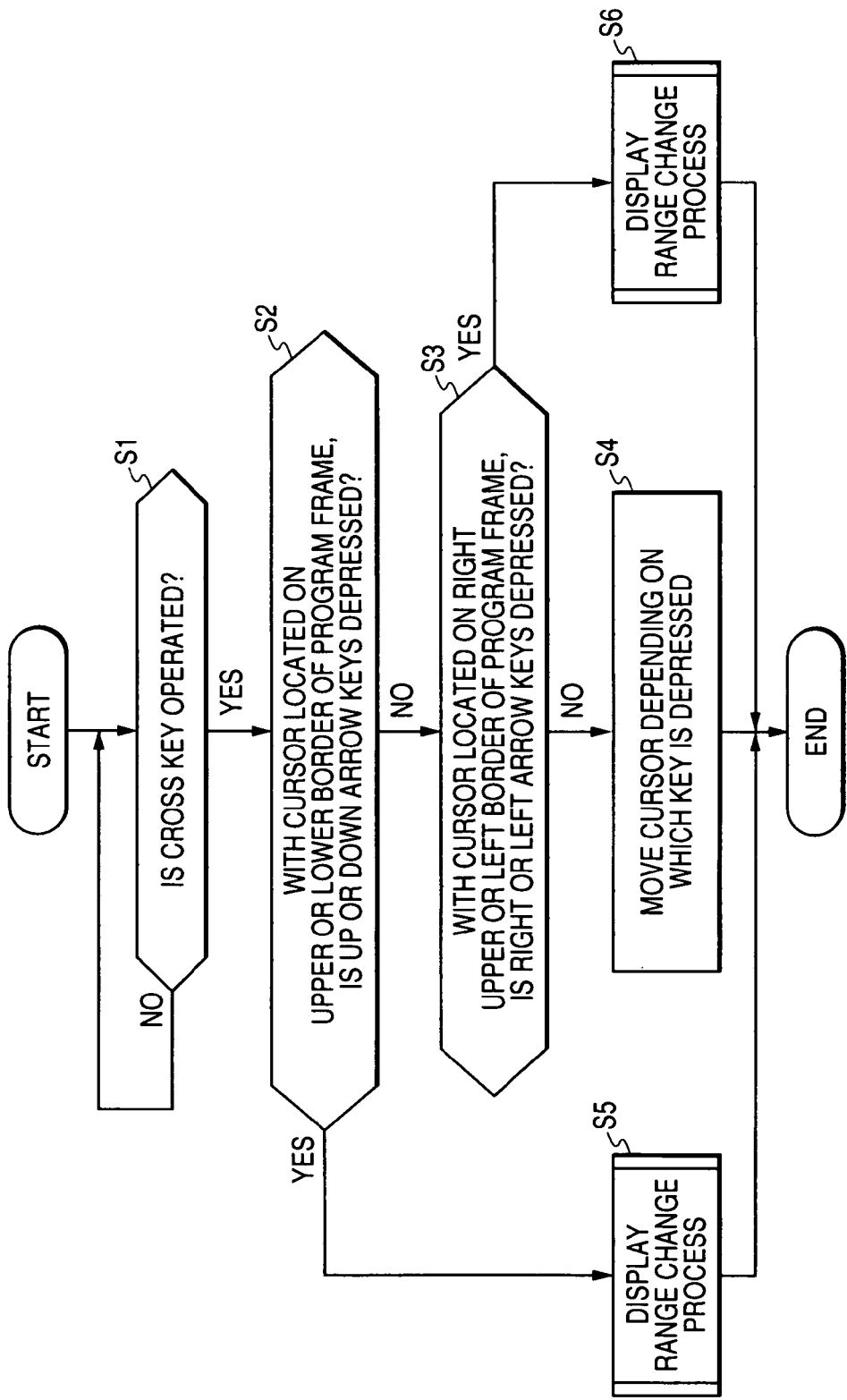
FIG. 6 is a flowchart illustrating the operation of the receiver of FIG. 1.

By referring to the flowchart of FIG. 6, described next is the operation of the receiver 3 in a case where the program schedule Fa1 is changed in display range.

In step S1, the processor 46 of the receiver 3 waits until the cross key 24B of the remote commander 24 is operated, and once operated, the procedure goes to step S2. Then, in the program schedule Fa1, when the cursor K is located on the upper border of the program frame, the processor 46 determines whether the up arrow key of the cross key 24B is operated, or whether the down arrow key thereof is operated when the cursor K is located on the lower border of the program frame. If determined that the cursor K is located neither on such borders, the procedure goes to step S3.

Figure 7:
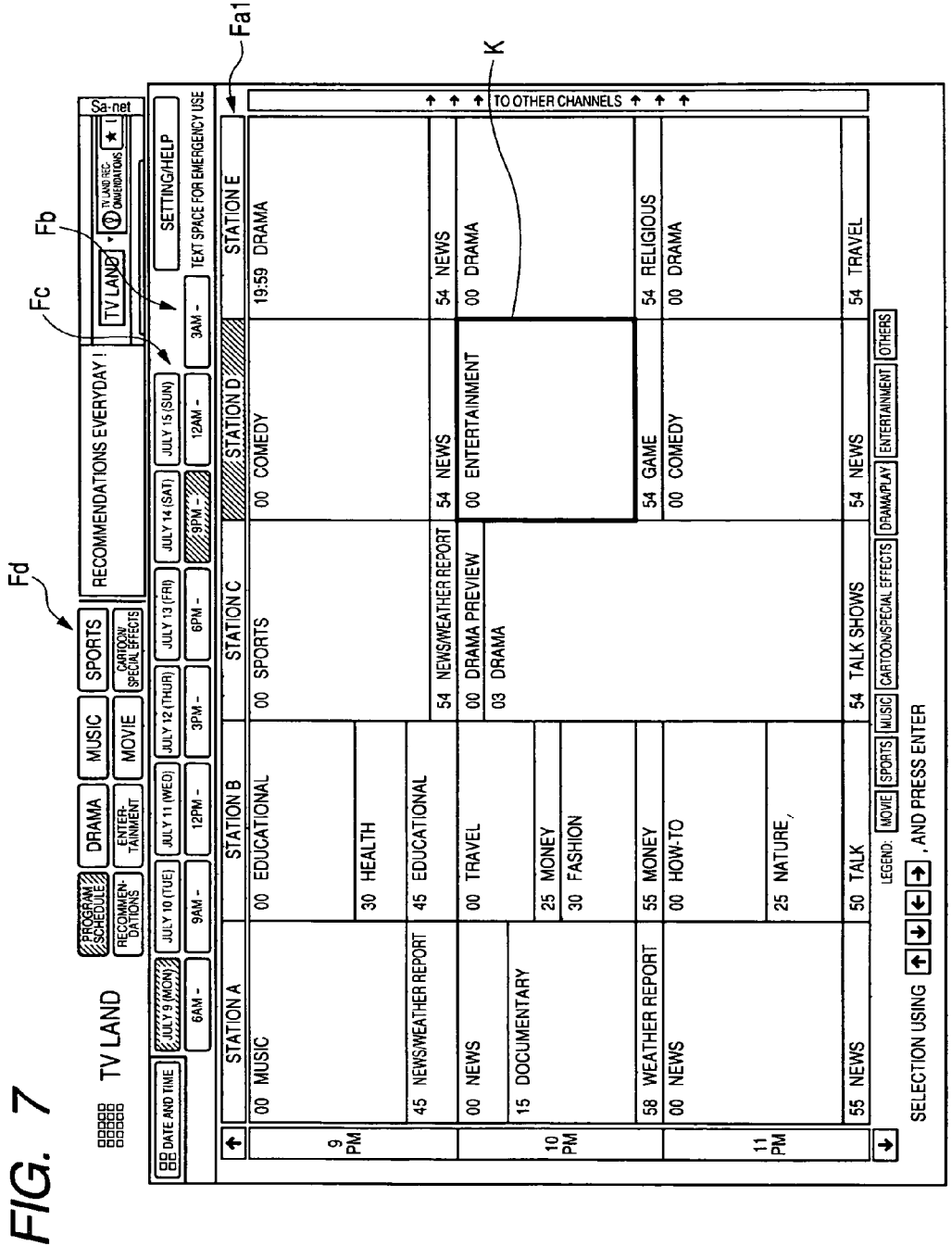
FIG. 7 is a diagram showing another exemplary EPG screen.

For example, as shown in FIG. 7, the procedure goes to step S3 when the cursor K is located neither on the upper border nor the lower border of the program frame of the program schedule Fa1.

In step S3, in the program schedule Fa1, when the cursor K is located on the right border of the program frame, the processor 46 determines whether the right arrow key of the cross key 24B is operated, or whether the left arrow key thereof is operated when the cursor K is on the left border of the program frame. If determined that the cursor K is located neither on such borders, the procedure goes to step S4.

For example, as shown in FIG. 7, the procedure goes to step S4 when the cursor K is located neither on the right border nor the left border of the program frame of the program schedule Fa1.

In step S4, the processor 46 moves the cursor K in response to the operation of the cross key 24B of the remote commander 24.

In FIG. 7 example, the cursor K is moved to the border between the programs, vertically or horizontally.

Figure 8:
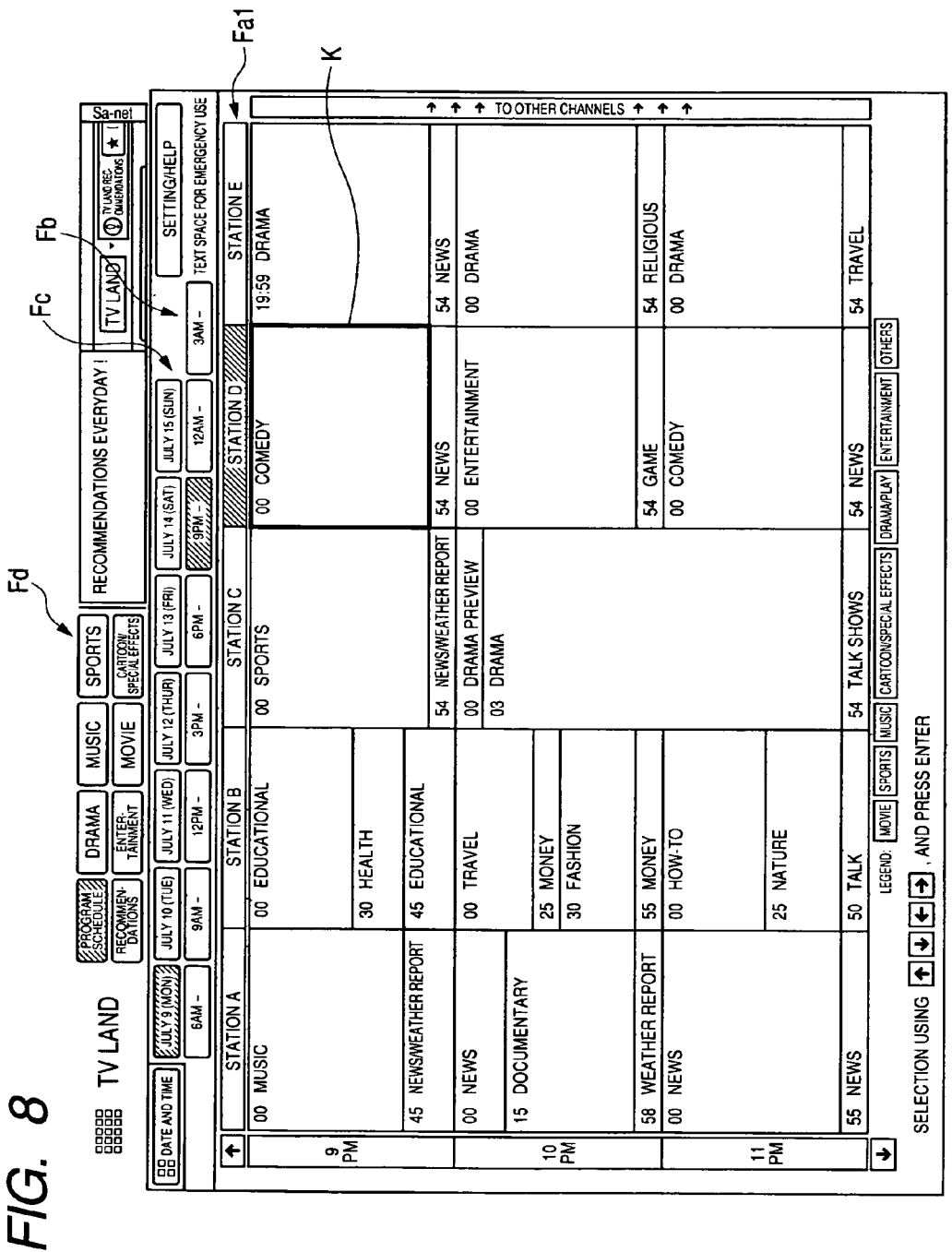
FIG. 8 is a diagram showing still another exemplary EPG screen.
Figure 9:
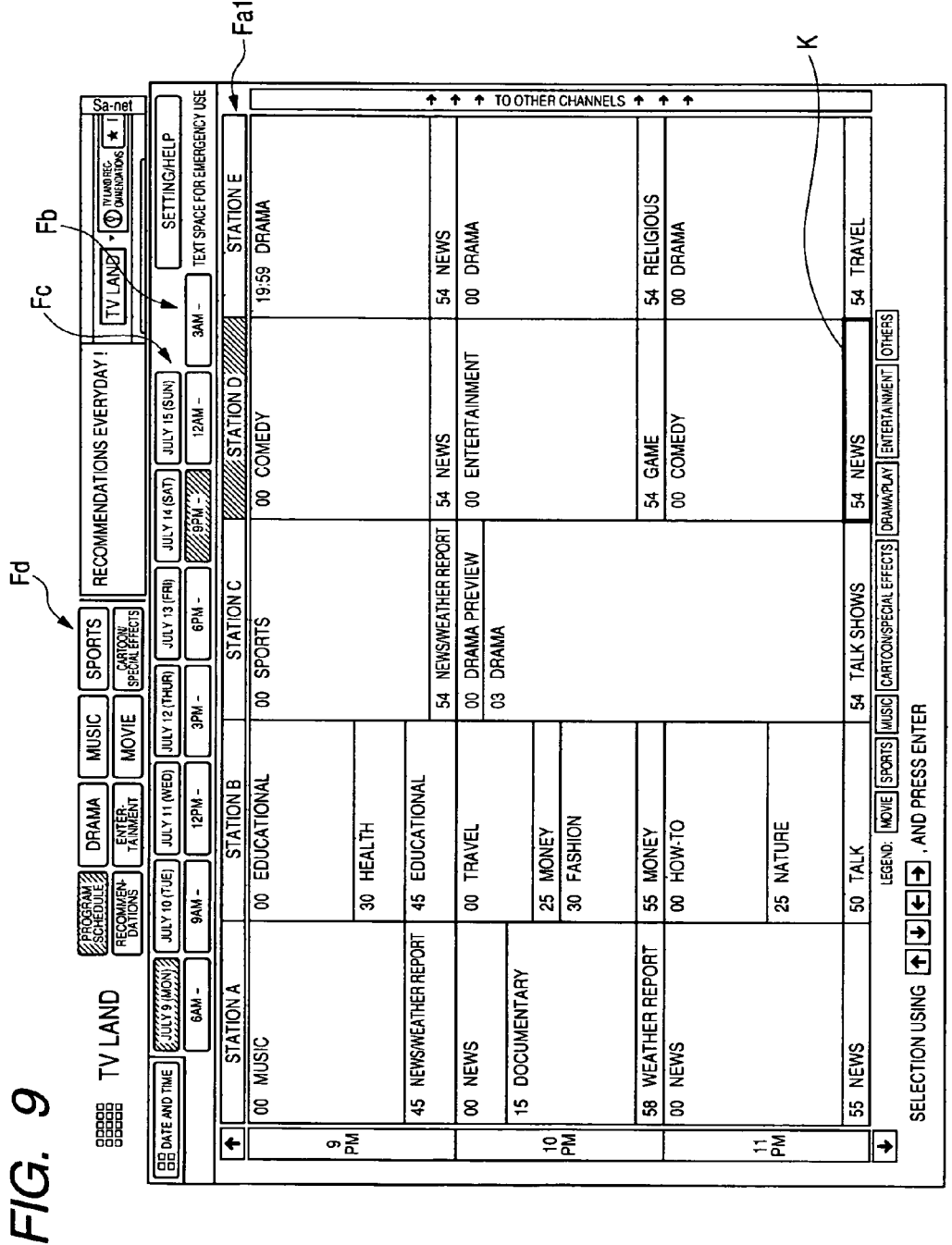
FIG. 9 is a diagram showing still another exemplary EPG screen.

As shown in FIG. 8, if the up arrow key of the cross key 24B is determined in step S2 as operated when the cursor K is located on the upper border of the program frame, or as shown in FIG. 9, if the down arrow key is determined as operated when the cursor K is on the lower border of the program frame, the procedure goes to step S5. In step S5, the processor 46 executes a display range change process, the details of which are described by referring to the flowchart of FIG. 10.

In step S21, if the up arrow key of the cross key 24B is operated when the cursor K is on the upper border of the program frame (FIG. 8), a determination is made whether there is any preceding program (past program) not currently displayed in the program schedule Fa1. Similarly, if the down arrow key of the cross key 24B is operated when the cursor K is on the lower border of the program frame (FIG. 9), a determination is made whether there is any subsequent program (future program) not currently displayed in the program schedule Fa1.

Figure 11:
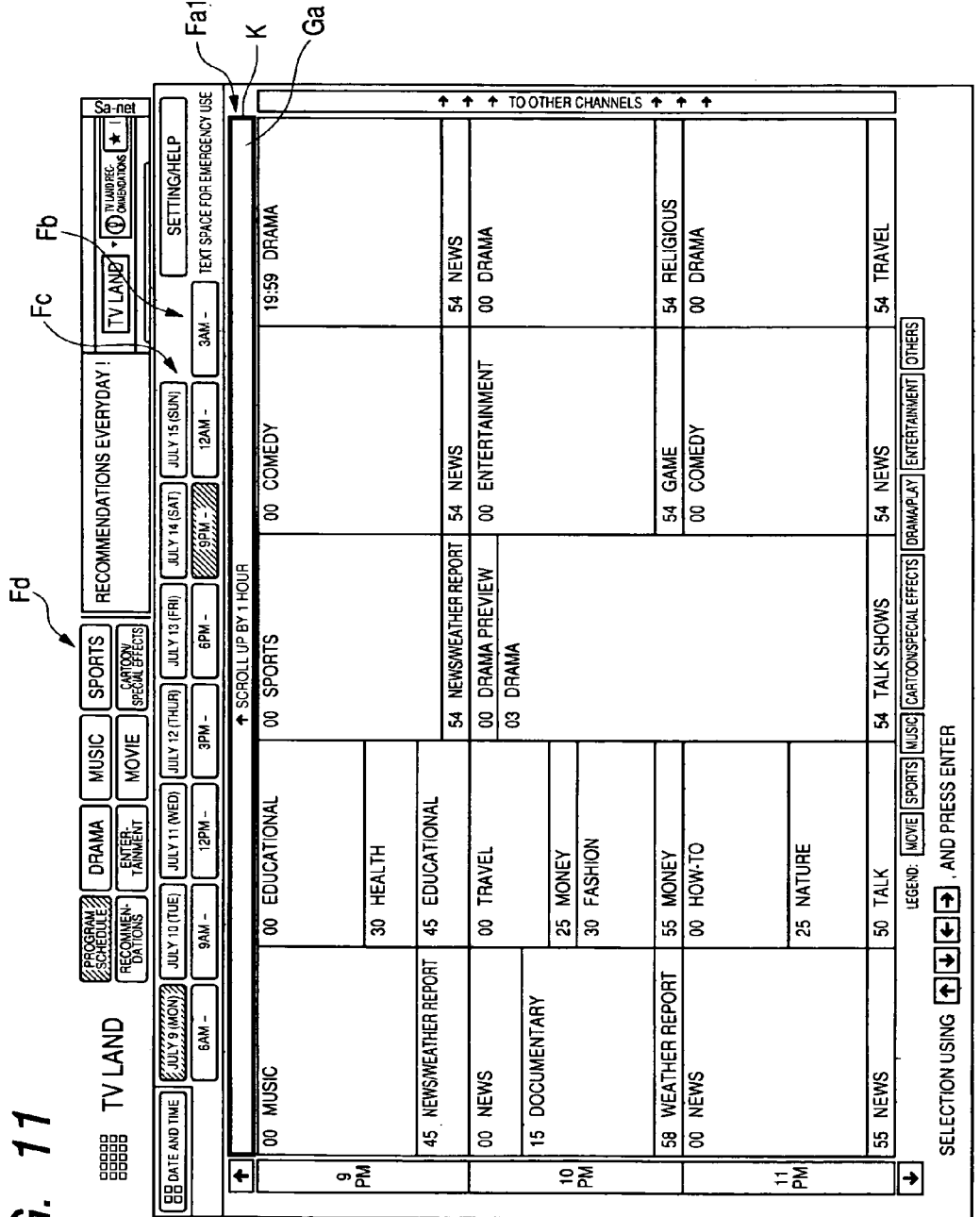
FIG. 11 is a diagram showing still another exemplary EPG screen.
Figure 12:
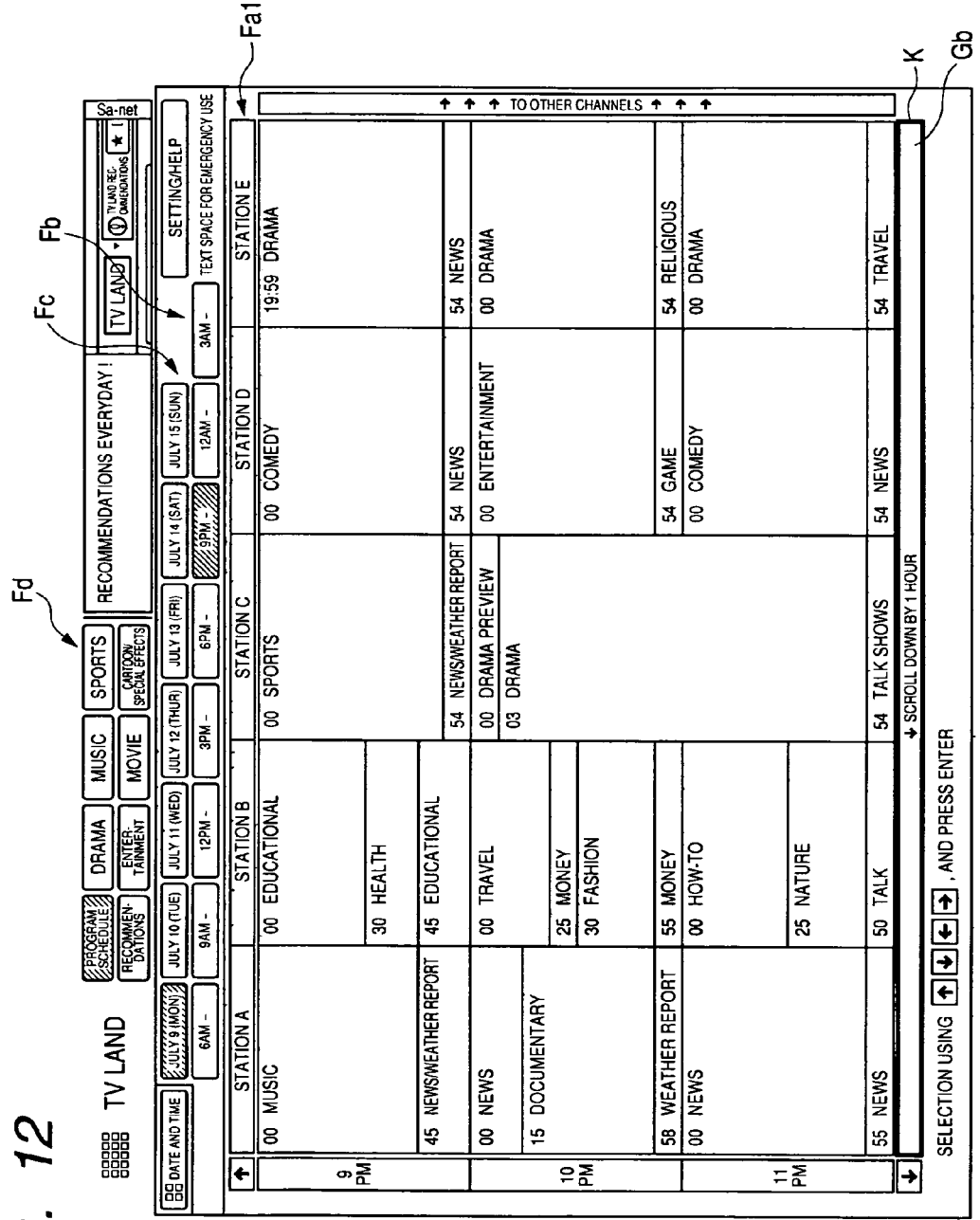
FIG. 12 is a diagram showing still another exemplary EPG screen.

If determined in step S21 that there is any preceding subsequent program, the procedure goes to step S22. In step S22, the processor 46 overlays the display Ga of "scroll up by 1 hour" on the station name sections of the program schedule Fa1 as shown in FIG. 11, or displays the display Gb of "scroll down by 1 hour" adjacently below the program schedule Fa1 as shown in FIG. 12. At this time, the cursor K is moved onto the border of the display Ga or Gb whichever displayed.

Then in step S23, the processor 46 waits until the up or down arrow key of the cross key 24B or the enter key 24C is operated, and once operated, the procedure goes to step S24.

In step S24, the processor 46 determines whether the enter key 24C is operated or not, and if determined as operated, the procedure goes to step S25. Then, as shown in FIG. 13 or 14, the display Ga or Gb is highlighted for display, e.g., changed in display color or flashed, and the program schedule Fa1 is reconfigured with 1 hour scrolled up or down before display (examples reconfigured as such are not shown).

On the other hand, if the enter key 24C is determined as not operated in step S24, it means that the up or down arrow key of the cross key 24B is operated. Thus, in step S26, the cursor key K is moved in response to the operation.

Figure 15:
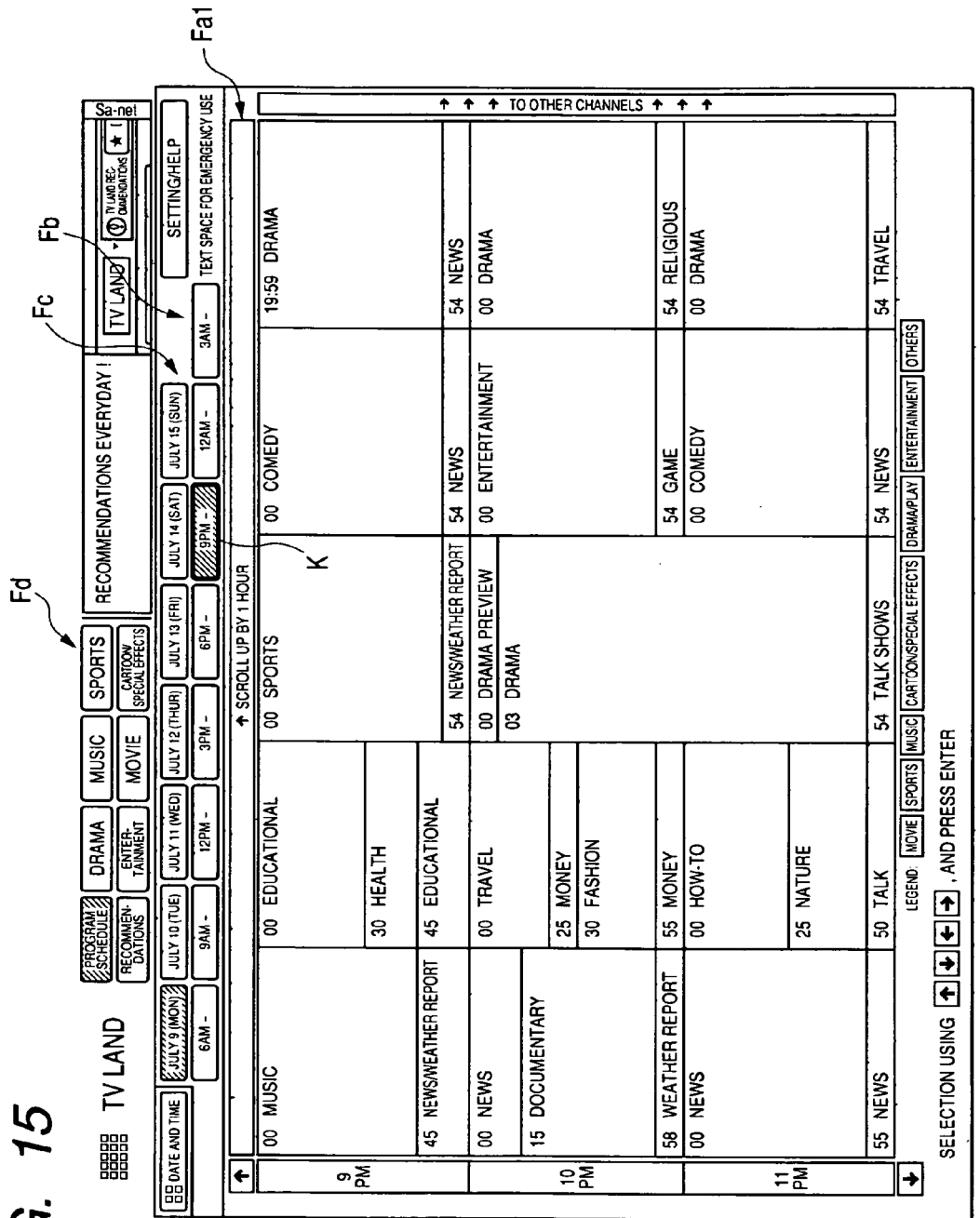
FIG. 15 is a diagram showing still another exemplary EPG screen.
Figure 16:
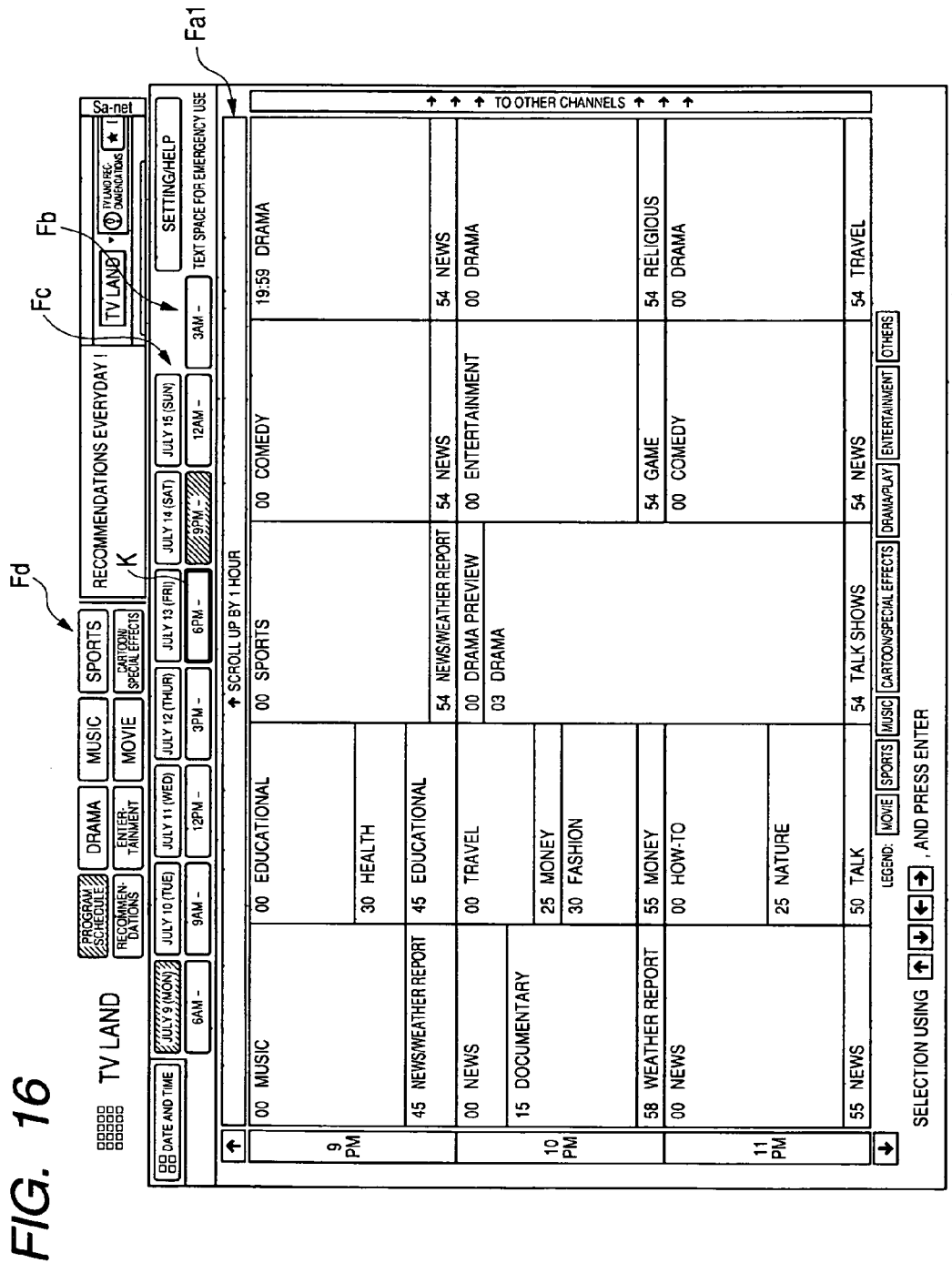
FIG. 16 is a diagram showing still another exemplary EPG screen.
Figure 17:
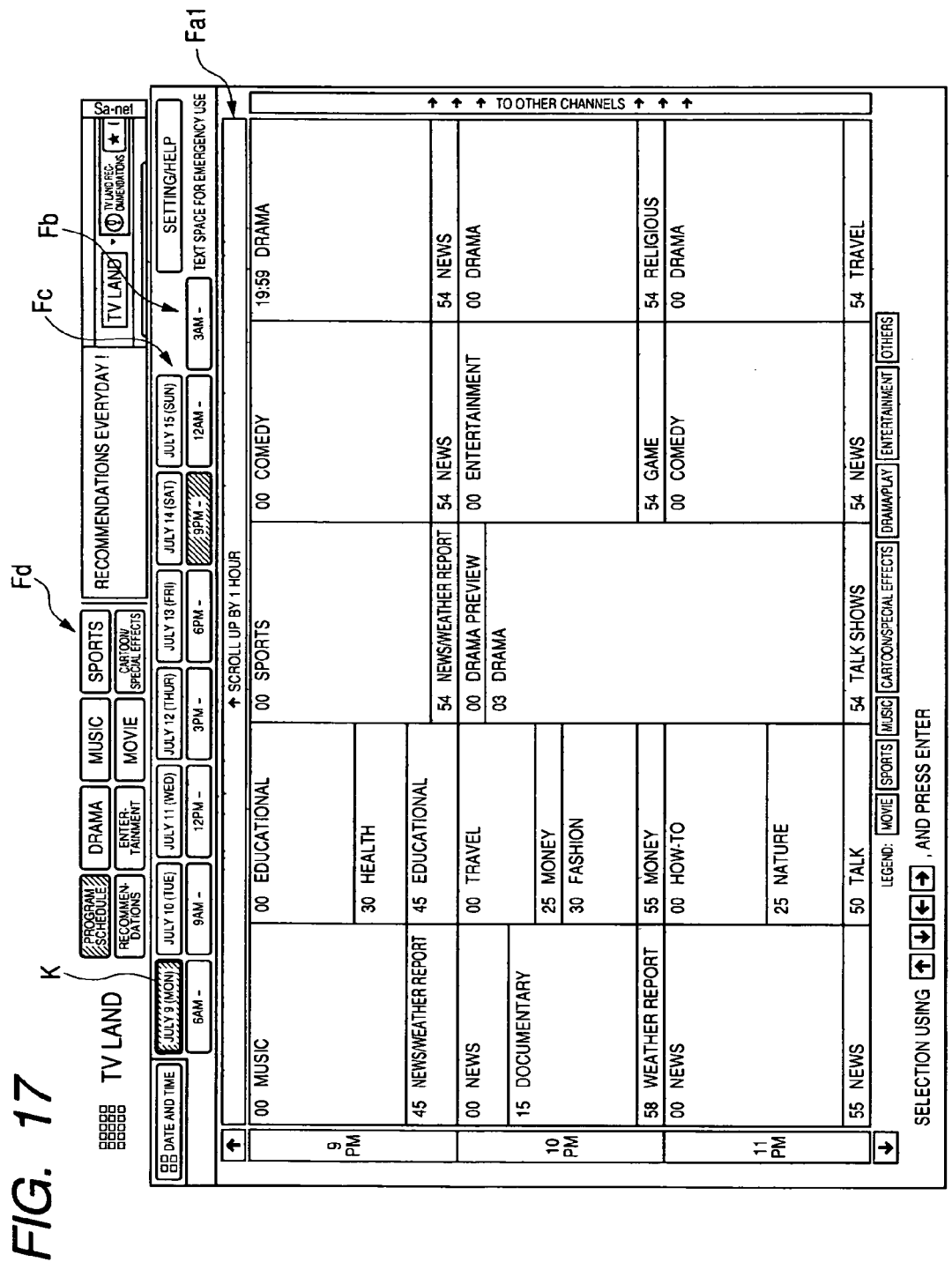
FIG. 17 is a diagram showing still another exemplary EPG screen.
Figure 18:
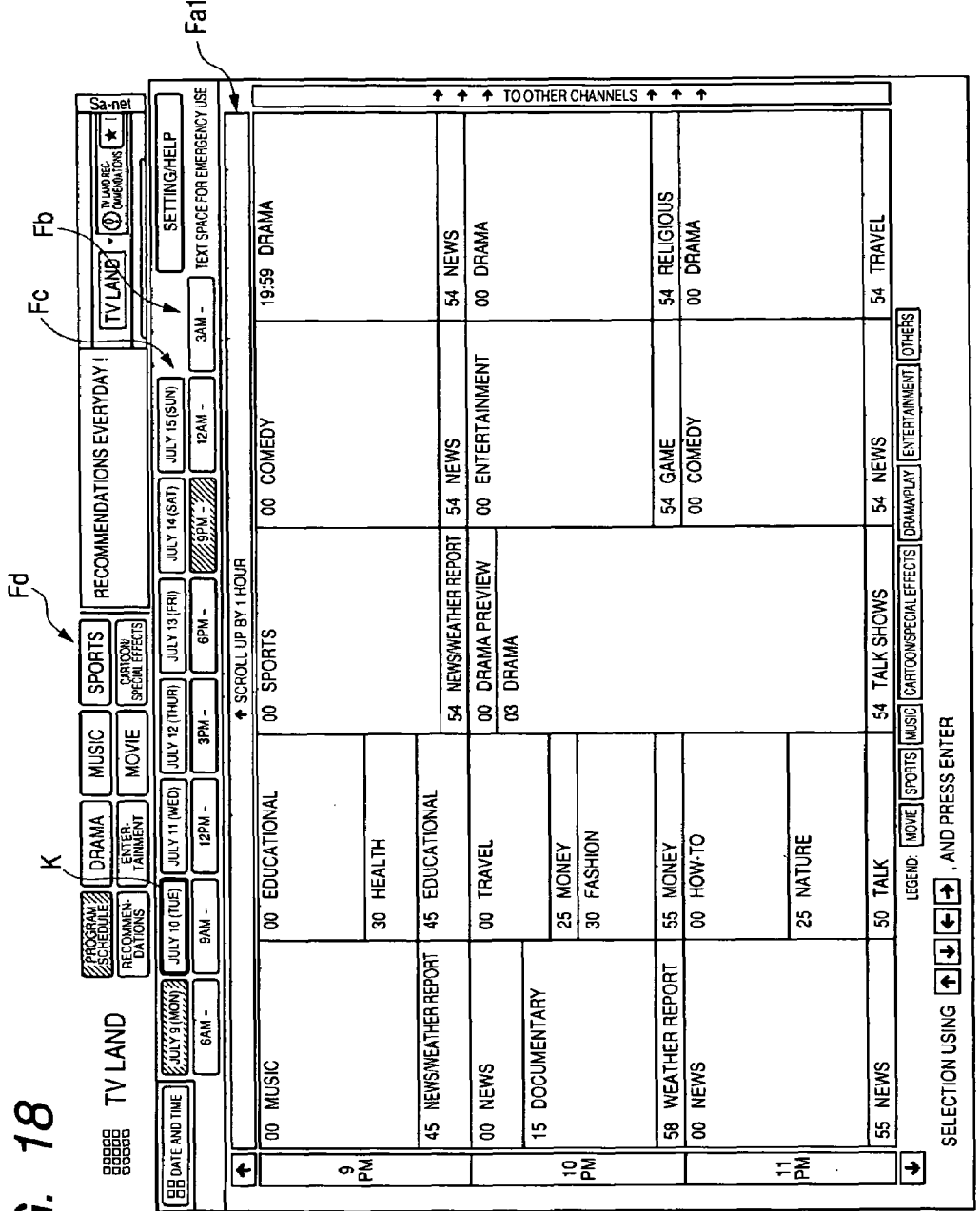
FIG. 18 is a diagram showing still another exemplary EPG screen.

Referring to FIG. 11, described here is a case where the up arrow key of the cross key 24B is operated during when the display Ga is displayed. In such a case, the cursor K located in the program schedule Fa1 is moved toward the shortcut buttons Fb (FIG. 15). This allows the user to select any desired shortcut button Fb by operating the cross key 24B or the enter key 24C of the remote commander 24 (FIG. 16). Then, if the up arrow key is continuously operated, the cursor K is moved from the shortcut buttons Fb to the shortcut buttons Fc (FIG. 17). This allows the user to select any desired shortcut button Fc by operating the cross key 24B or the enter key 24C of the remote commander 24 (FIG. 18).

Figure 19:
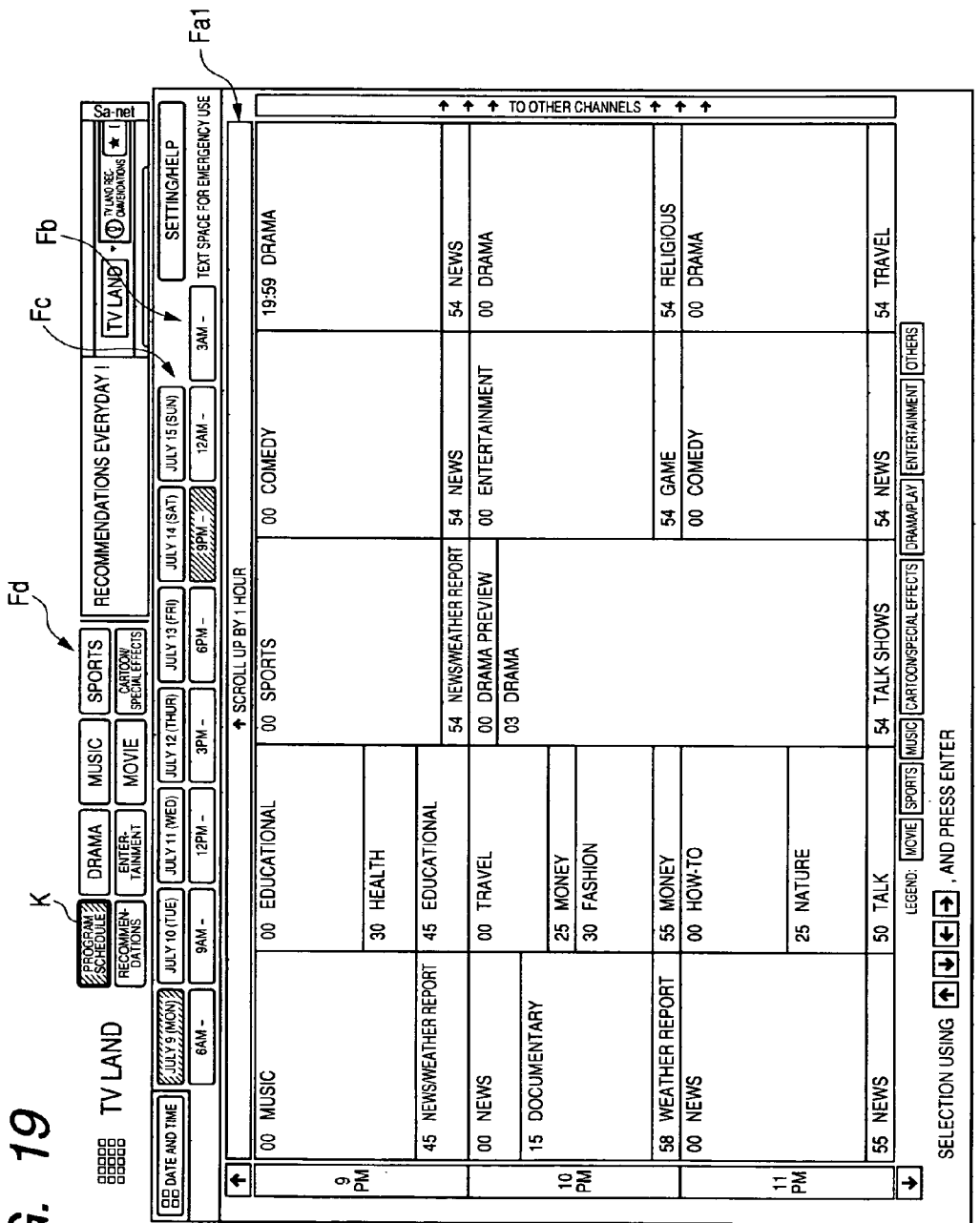
FIG. 19 is a diagram showing still another exemplary EPG screen.
Figure 20:
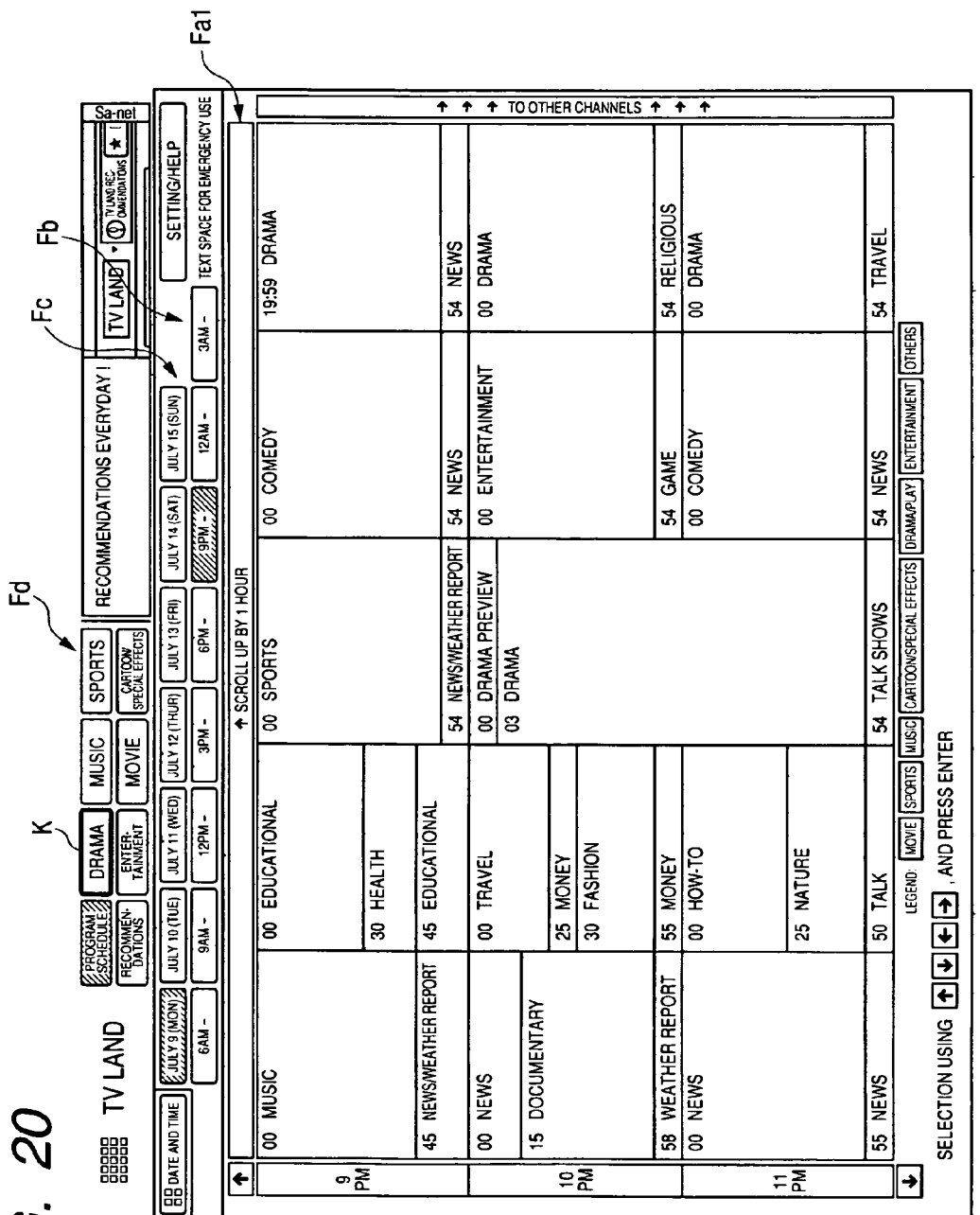
FIG. 20 is a diagram showing still another exemplary EPG screen.

If the up arrow key is still continuously operated, the cursor K is moved from the shortcut buttons Fc to the link buttons Fd (FIG. 19). This allows the user to select any desired link button Fd by operating the cross key 24B or the enter key 24C of the remote commander 24 (FIG. 20).

Figure 21:
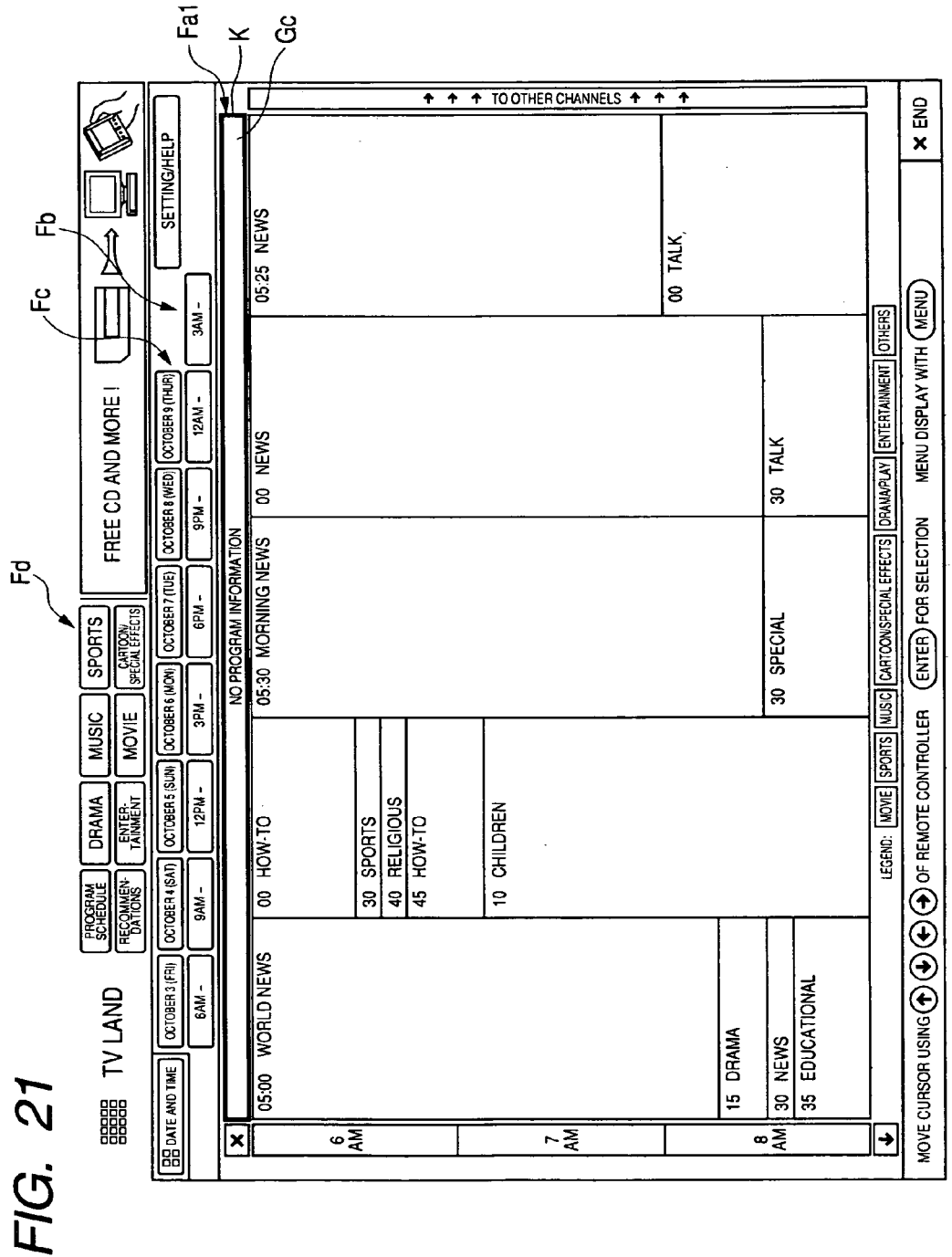
FIG. 21 is a diagram showing still another exemplary EPG screen.
Figure 22:
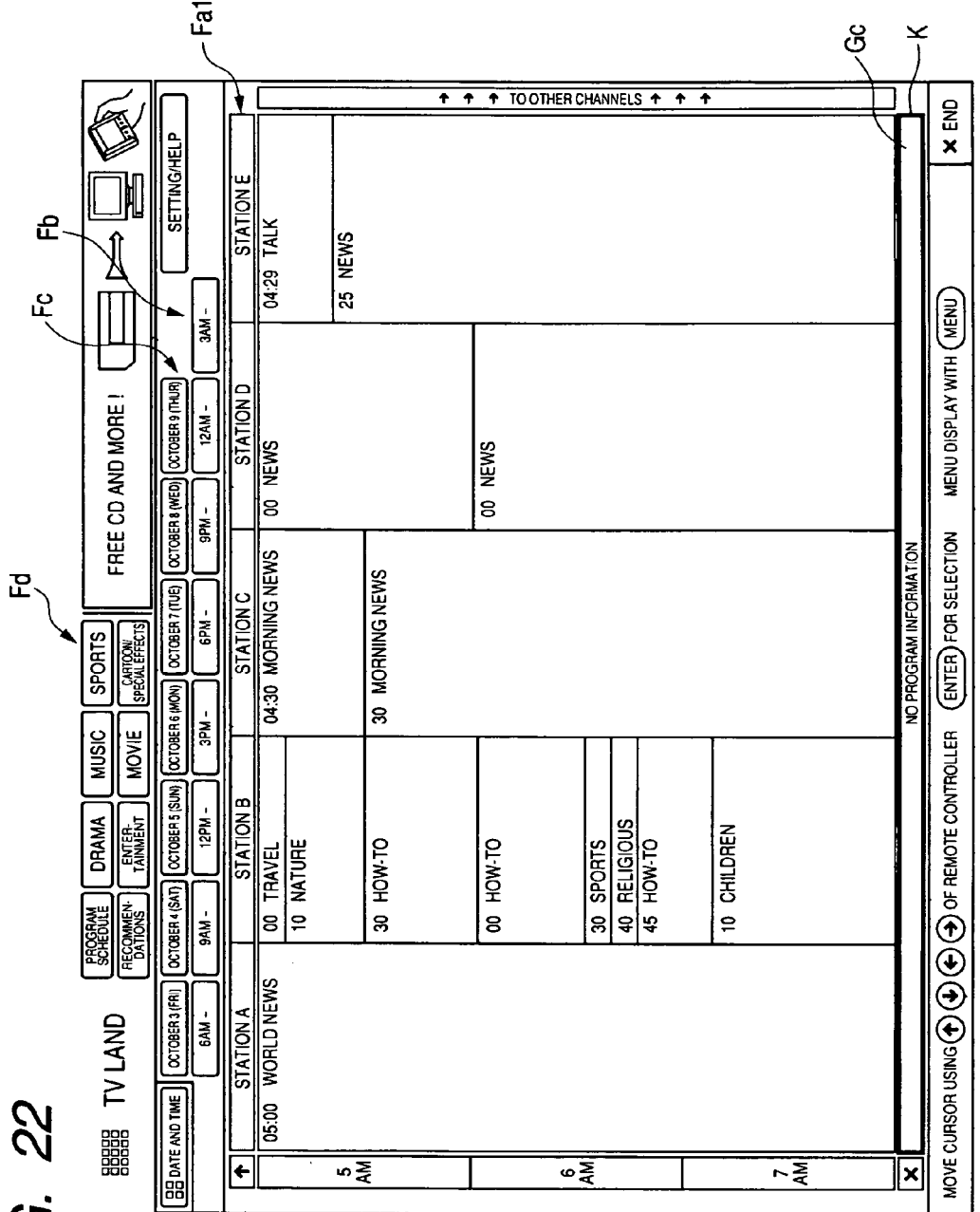
FIG. 22 is a diagram showing still another exemplary EPG screen.

Referring back to FIG. 10, if determined in step S21 that there is neither preceding nor subsequent program, the procedure goes to step S27. Then, as shown in FIG. 21 or 22, the processor 46 displays a display Gc of "no information" instead of the display Ga or Gb. The cursor K is accordingly moved to the display Gc.

Such a display range change process is ended when the 1-hour-scrolled-up or -down program schedule Fa1 is displayed in step S25, when the cursor K is moved in step S26, and when the display Gc is displayed in step S27. With the display range change process ended, the process of FIG. 6 is also ended.

Note here that in FIG. 11 or 12 example, the program schedule Fa1 is scrolled up or down on an hour basis. This is surely not restrictive, and as shown in FIG. 23, the display Gb may be plurally displayed, e.g., display Gb1 of "scroll down by 1 hour" and display Gb2 of "scroll down by 2 hours", for selection how many hours to scroll down at a time. This is applicable also for scrolling up the program schedule Fa1.

Figure 24:
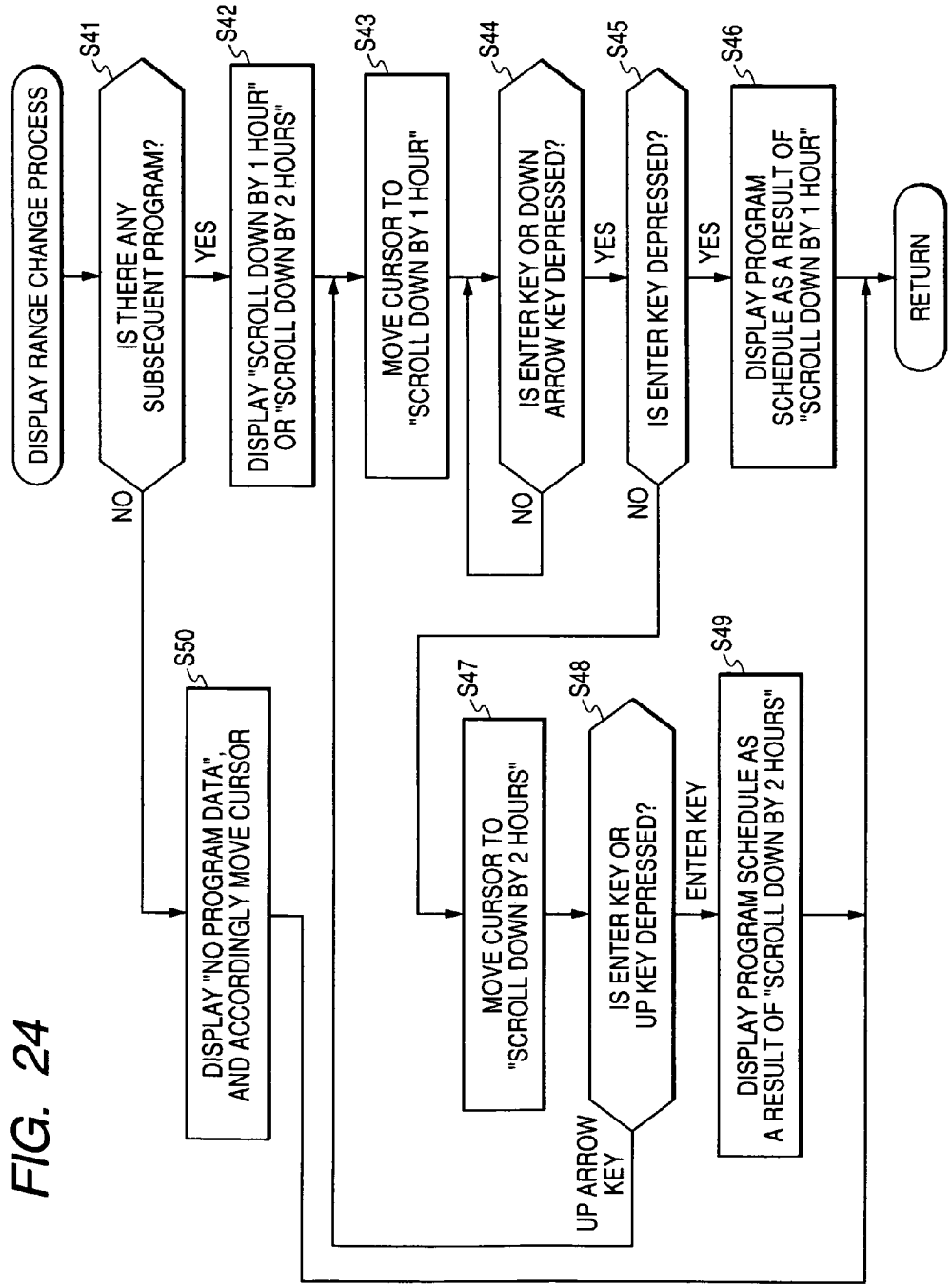
FIG. 24 is a flowchart illustrating still another operation of the receiver of FIG. 1.

Referring to the flowchart of FIG. 24, described next is the operation of the processor 46 in such a case of plurally displaying the displays Gb.

In step S41, when the down arrow key of the cross key 24B is operated with the cursor K located on the lower border of the program frame (FIG. 9), the processor 46 determines whether there is any subsequent program (future program) not currently displayed in the program schedule Fa1.

When determined in step S41 that there is any subsequent program, the procedure goes to step S42. The processor 46 then displays the display Gb1 of "scroll down by 1 hour" and the display Gb2 of "scroll down by 2 hours" adjacently below the program schedule Fa1 as shown in FIG. 23. In step S43, the cursor K is moved onto the border of the display Gb1.

Then in step S44, the processor 46 waits until either the down arrow key of the cross key 24B or the enter key 24C is operated, and once operated, the procedure goes to step S45.

In step S45, the processor 46 determines whether the enter key 24C is operated or not. If determined as operated, the procedure goes to step S46. In step S46, the display Gb1 is highlighted for display, and then the 1-hour-scrolled-down program schedule Fa1 is accordingly displayed.

On the other hand, if determined in step S45 that the enter key 24C is not operated, it means that the down arrow key of the cross key 24B is operated. Accordingly, in step S47, the processor 46 moves the cursor K to the display Gb2 of "scroll down by 2 hours".

Then in step S48, the processor 46 waits until either the enter key 24C or the up arrow key is operated, and once the enter key 24C is operated, the procedure goes to step S49. In step S49, the display Gb2 of "scroll down by 2 hours" is highlighted for display, and then the 2-hour-scrolled-down program schedule Fa1 is accordingly displayed.

If determined in step S48 that the up arrow key is operated, the procedure returns to step S43, and the cursor K is moved to the display Gb1.

In step S41, if determined that there is no future program, the procedure goes to step S49. The processor 46 then displays the display Gc of "no information" instead of the displays Gb1 and Gb2.

Such a display range change process is ended when the 1-hour-scrolled-down or 2-hour-scrolled-down program schedule Fa1 is displayed in step S46 or S49, or when the display Gc is displayed in step S50.

Figure 25:
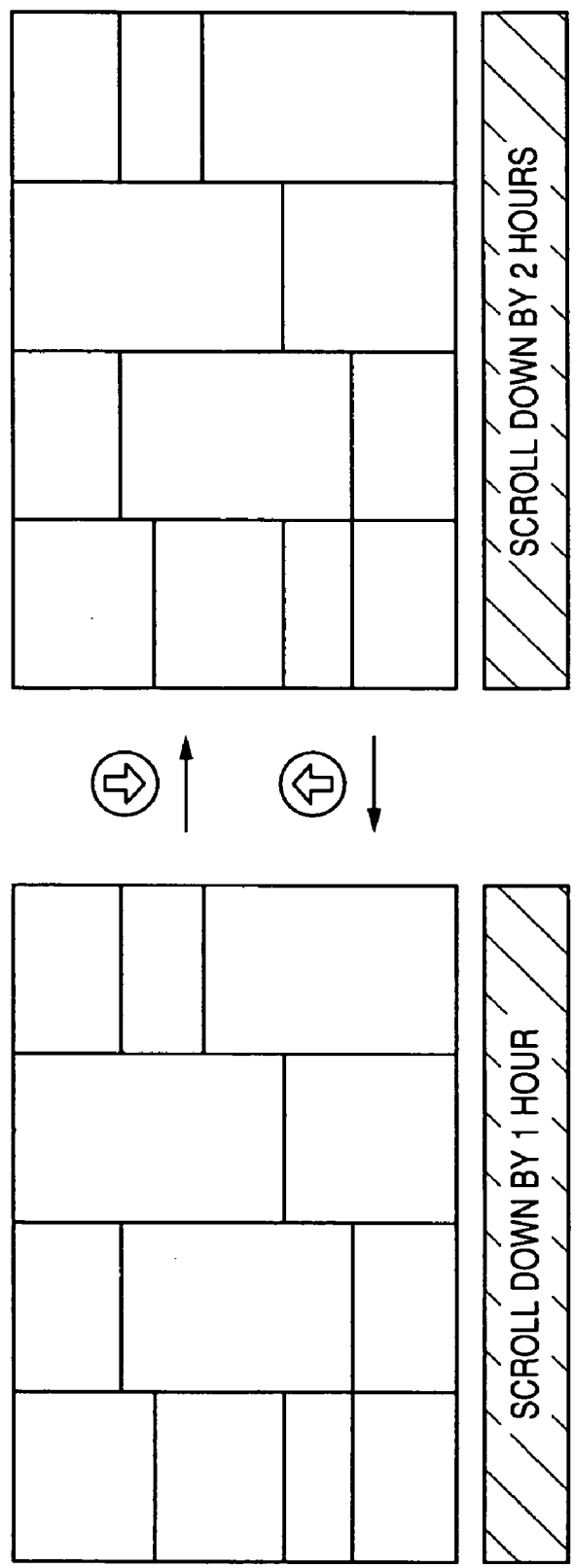
FIG. 25 is a diagram showing still another exemplary EPG screen.

FIG. 25 shows the transition between the displays Gb1 and Gb2. That is, in response to the operation of the up or down arrow key of the cross key 24B of the remote commander 24, a selection is made between the displays Gb1 and GB2.

Figure 26:
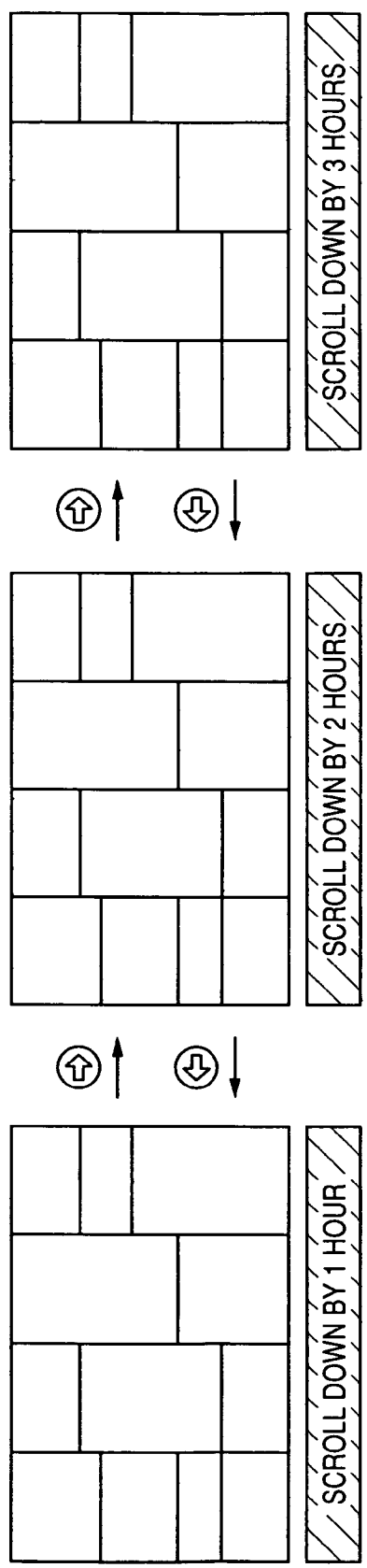
FIG. 26 is a diagram showing still another exemplary EPG screen.
Figure 27:
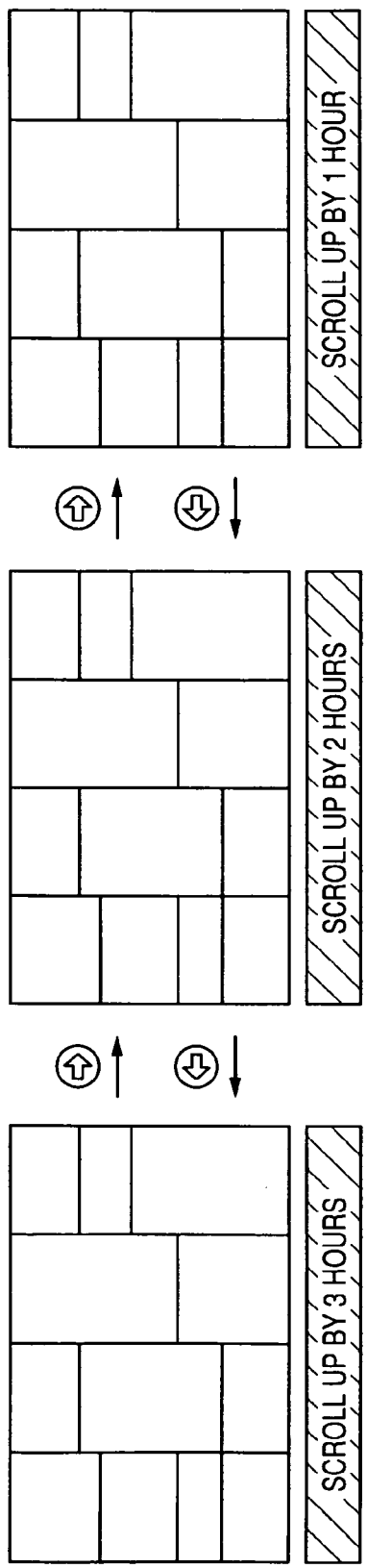
FIG. 27 is a diagram showing still another exemplary EPG screen.

In FIG. 23 example, the display Gb is singly selected from those plurally provided. Alternatively, as shown in FIG. 26 or 27, switching may be performed among the displays Gb through operation of the right or left arrow key of the cross key 24B.

Figure 28:
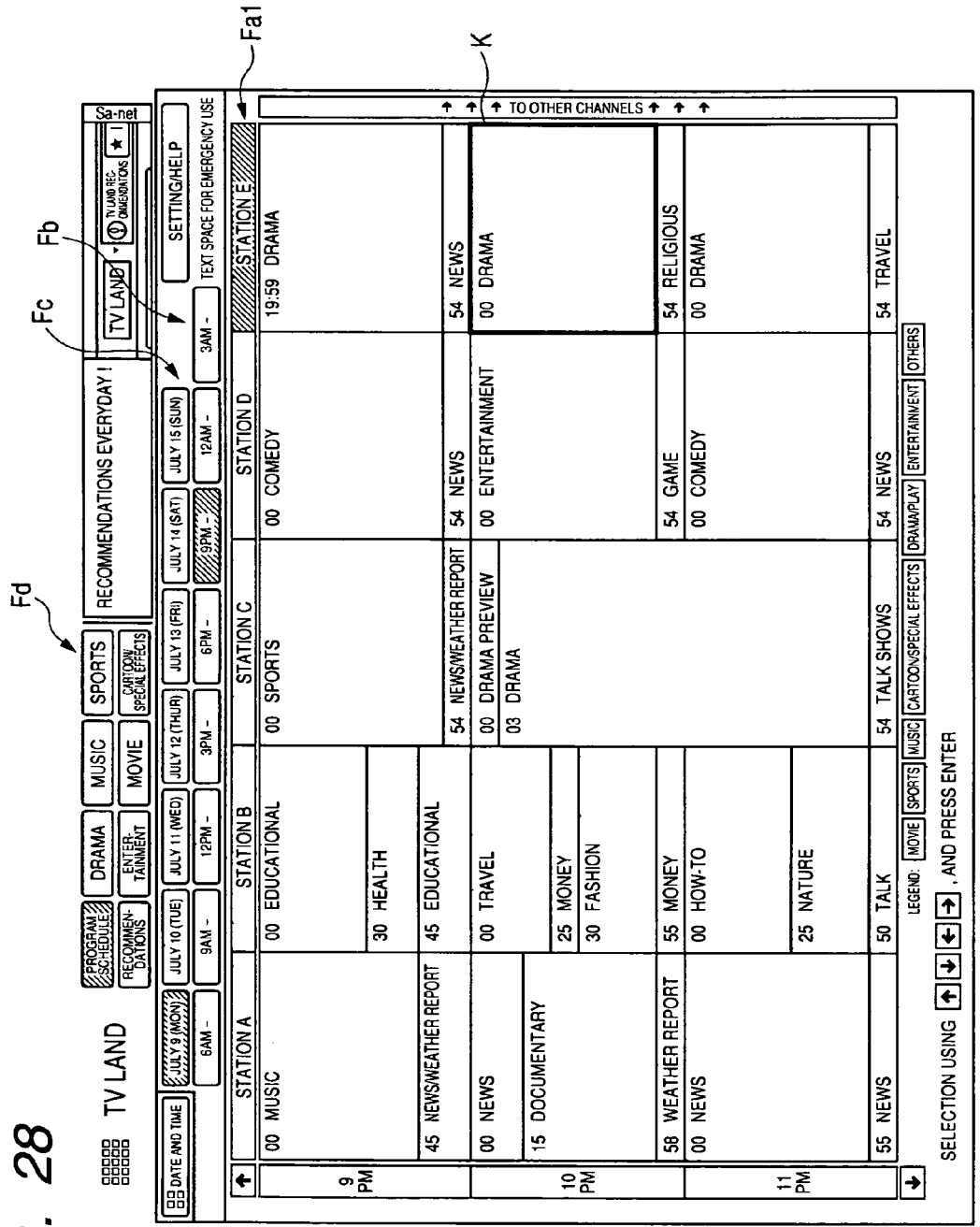
FIG. 28 is a diagram showing still another exemplary EPG screen.

Referring back to FIG. 6 for step S3. When the right arrow key of the cross key 24B is operated during when the cursor K is located on the right border of the program frame as shown in FIG. 28, or when the left arrow key is operated during when the cursor K is on the left border of the program frame (not shown), the procedure goes to step S6. In step S6, the processor 46 goes through the display range change process, details of which are described by referring to the flowchart of FIG. 29.

In step S51, if the right arrow key of the cross key 24B is operated during when the cursor K is located on the right border of the program frame (FIG. 28), a determination is made whether there are any programs of a broadcasting station(s) larger in channel number than those displayed in the program schedule Fa1. If the left arrow key of the cross key 24B is operated during when the cursor K is located on the left border of the program frame, a determination is made whether there are any programs of a broadcasting station(s) smaller in channel number than those displayed in the program schedule Fa1.

If determined there are such a broadcasting station(s) in step S51, the procedure goes to step S52. The processor 46 then highlights the display of "to other channels" as exemplarily shown in FIG. 30 or writes the display over the time sections of the program schedule Fa1 (such an example is not shown).

Alternatively, instead of not always displaying "to other channels", the section may be displayed with advertisements or promotion details until the procedure goes to step S52. Then in step S52, the section may be displayed with the highlighted display of "to other channels" instead of the advertisement or the promotion details.

Next in step S53, the processor 46 waits until the right or left arrow key of the cross key 24B or the enter key 24C is operated, and once operated, the procedure goes to step S54.

Then, in step S54, the processor 46 makes a determination whether the enter key 24C is operated or not. If determined as operated, the procedure goes to step S55. In step S55, the program schedule Fa1 is reconfigured for display, i.e., scrolled by a broadcasting station so as to newly display programs of a broadcasting station larger or smaller in station number.

On the other hand, when determined in step S54 that the enter key 24C is not operated, it means that the right or left arrow key of the cross key 24B is operated. Thus, in response to the operation thereof, the processor 46 moves the cursor K to the program border between the programs, vertically or horizontally, in step S56.

When determined in step S51 that there are no programs of a broadcasting station(s) larger or smaller in channel number than those displayed in the program schedule Fa1, the procedure goes to step S57. The processor 46 then displays the display Gc of "no information".

The display range change process is ended when the program schedule Fa1 displayed in step S55 includes the programs of a broadcasting station(s) larger or smaller in station number than those previously displayed, when the cursor K is moved in step S56, and when the display Gc is displayed in step S57. With the display range change process ended, the process of FIG. 6 is also ended.

Figure 30:
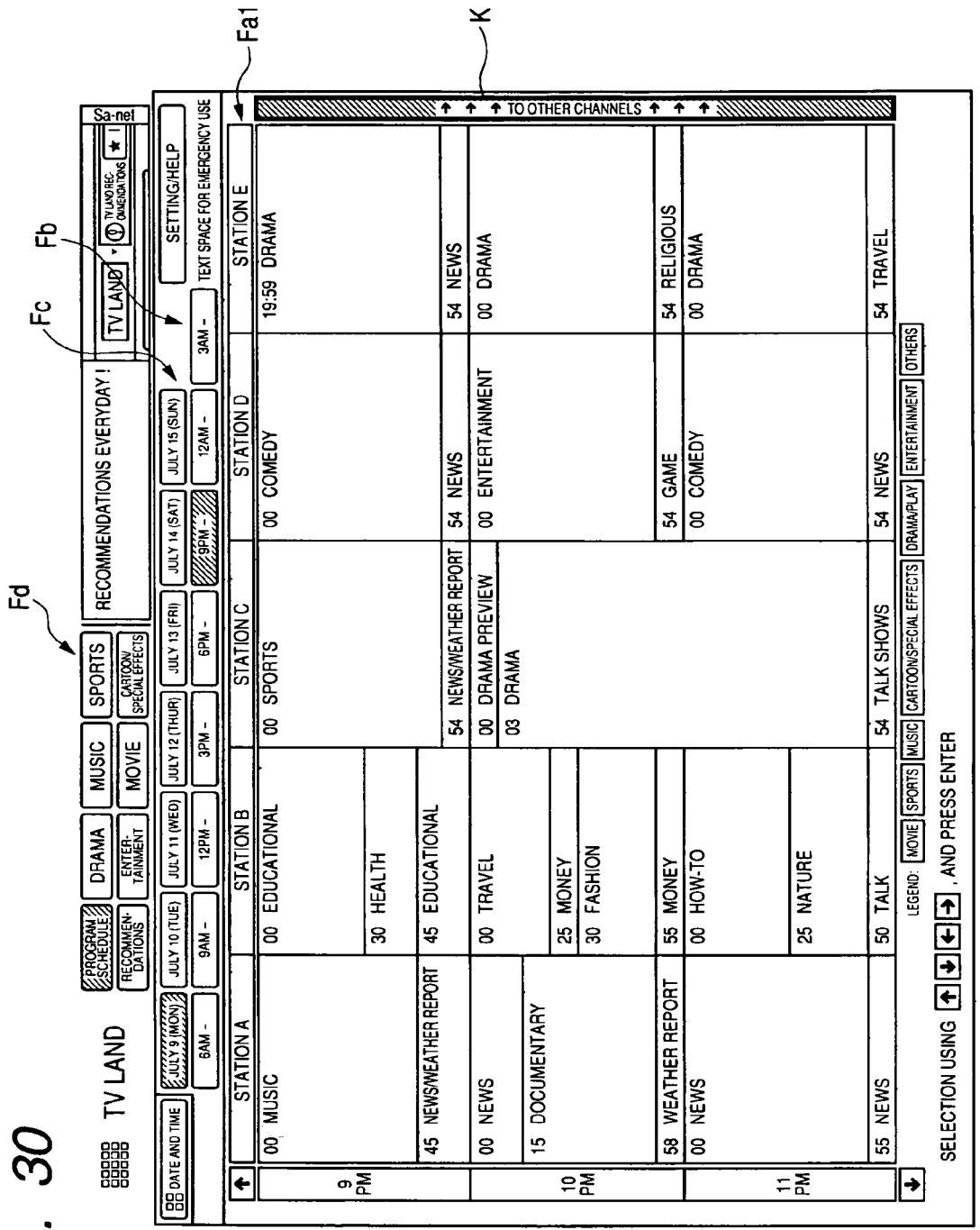
FIG. 30 is a diagram showing still another exemplary EPG screen.
Figure 31:
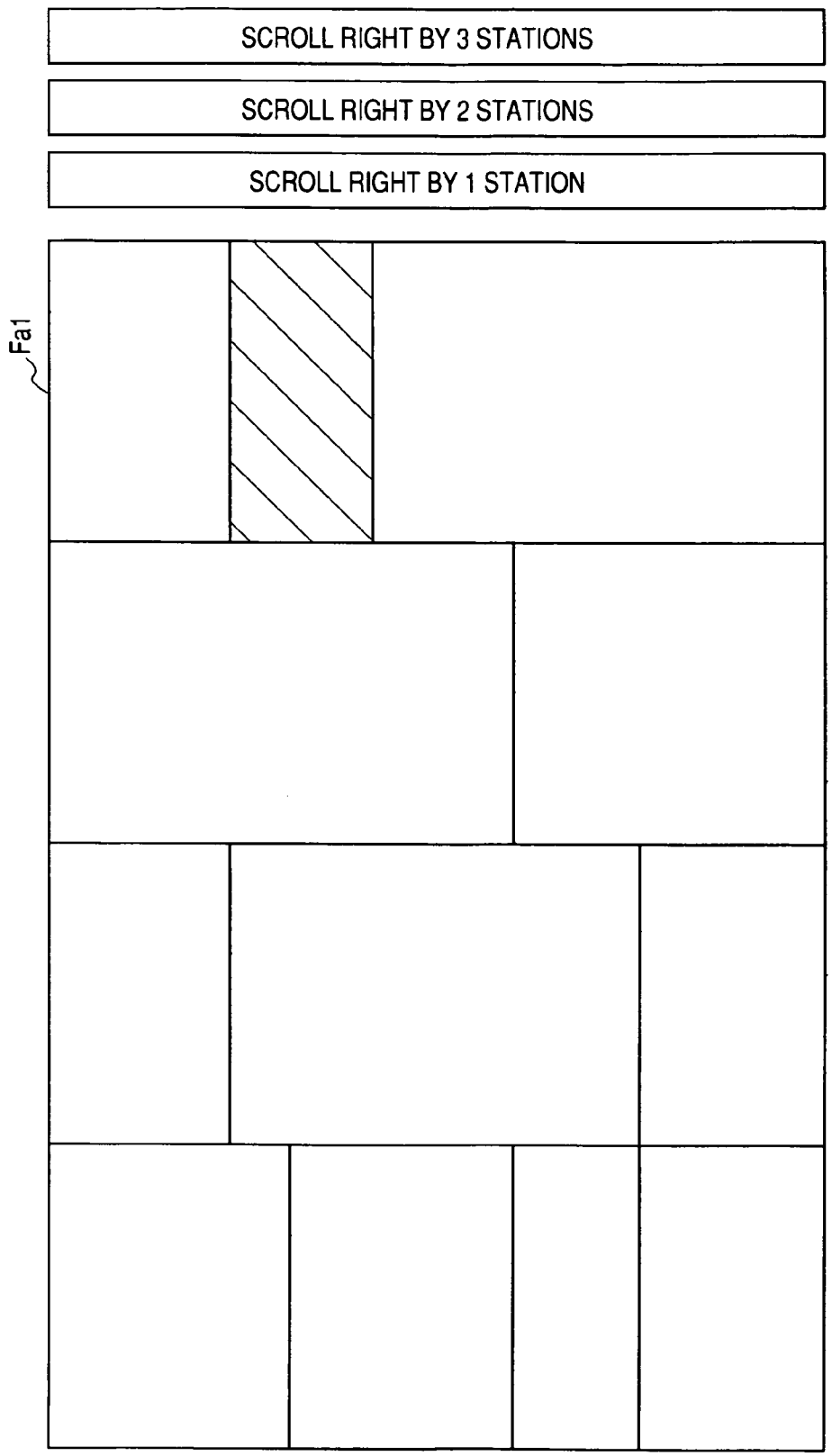
FIG. 31 is a diagram showing still another exemplary EPG screen.

Note here that in FIG. 30 example, the program schedule Fa1 is scrolled right on a station basis for the stations larger in station number. Alternatively, as shown in FIG. 31, the display may include display of "scroll by 1 station", display of "scroll by 2 stations", and display of "scroll by 3 stations" for example, and the program schedule Fa1 may be so configured that the program schedule Fa1 shifts to display the program schedules including one(s) of the station(s) larger in station number by one, two and three when the displays of "scroll by 1 station", "scroll by 2 stations" and "scroll by 3 stations" are selected, respectively.

Described above are the cases of changing the program schedule Fa1 in terms of display range in such a manner as to newly display the display contents those not currently displayed. With a similar operation of the cursor K, the display format of the program contents are also changeable.

The EPG screen of FIG. 32 displays not the program schedule Fa1 but the program contents on a "drama" basis. In the below, such a display is referred to as drama list Fa2. The EPG screen also includes icons Fe for advertisement on both sides of the drama list Fa2. Although those icons Fe in the drawing are shaded for brevity, displayed actually are texts and images of the advertisement details.

Figure 33:
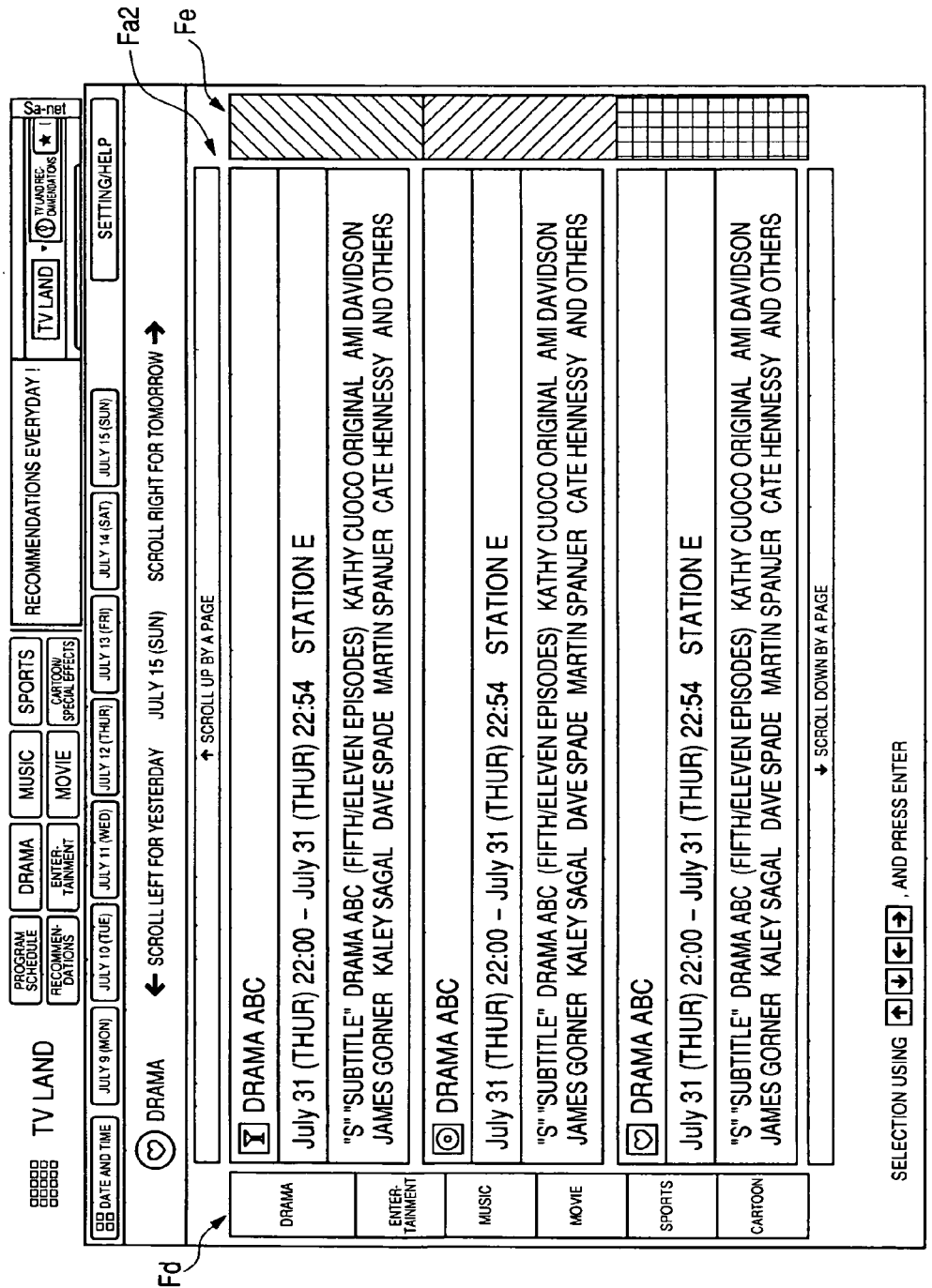
FIG. 33 is a diagram showing still another exemplary EPG screen.
Figure 34:
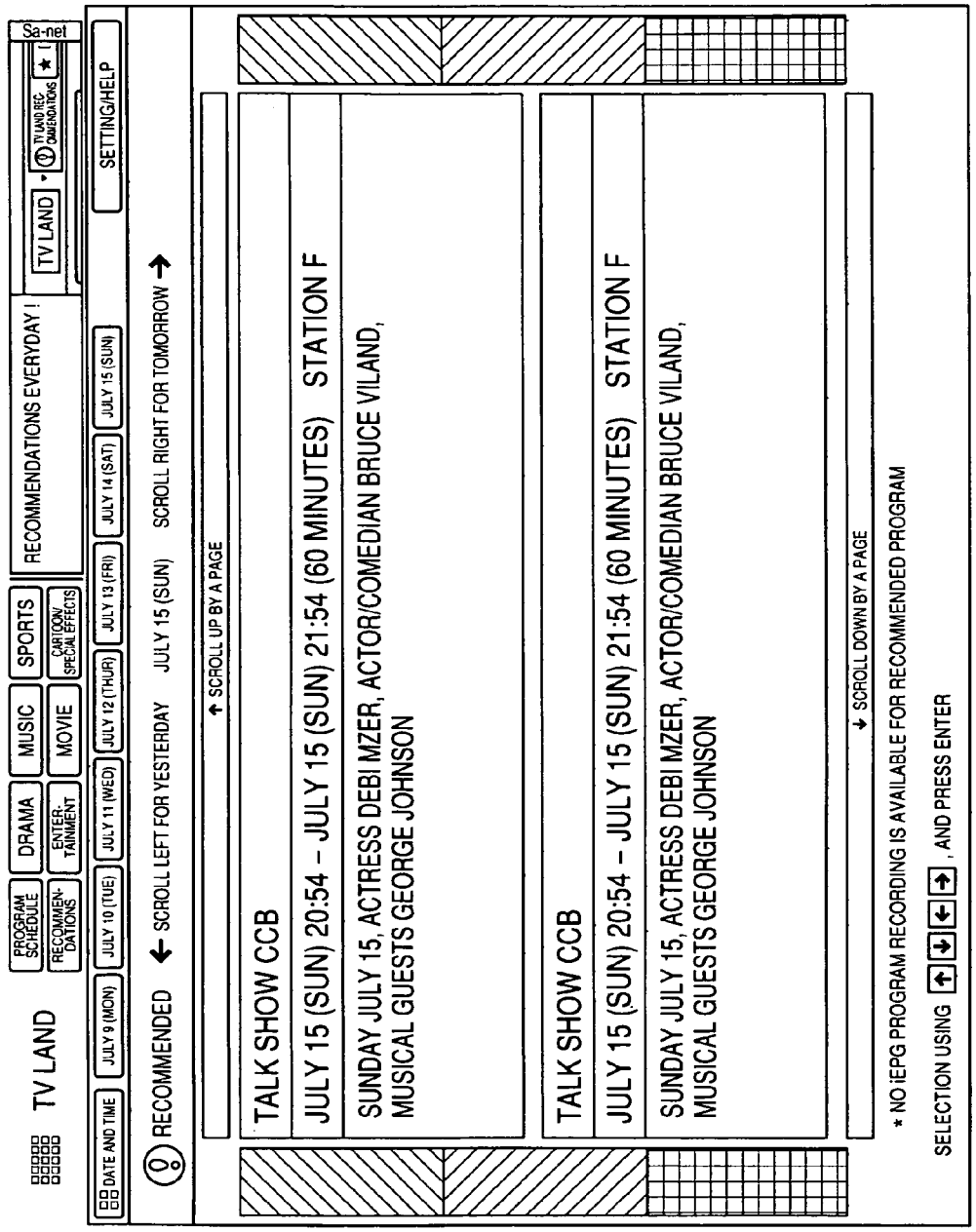
FIG. 34 is a diagram showing still another exemplary EPG screen.

In such an example, when the user operates the left arrow key of the cross key 24B, the link buttons Fd are displayed instead of the icons Fe on the left of FIG. 33 for changing the display format of the program contents. Assuming that the "recommendation button" Fd is selected among the link buttons Fd, the drama list Fa2 will be accordingly displayed as shown in FIG. 34 on a program basis whichever recommended (display Fa3).

Figure 35:
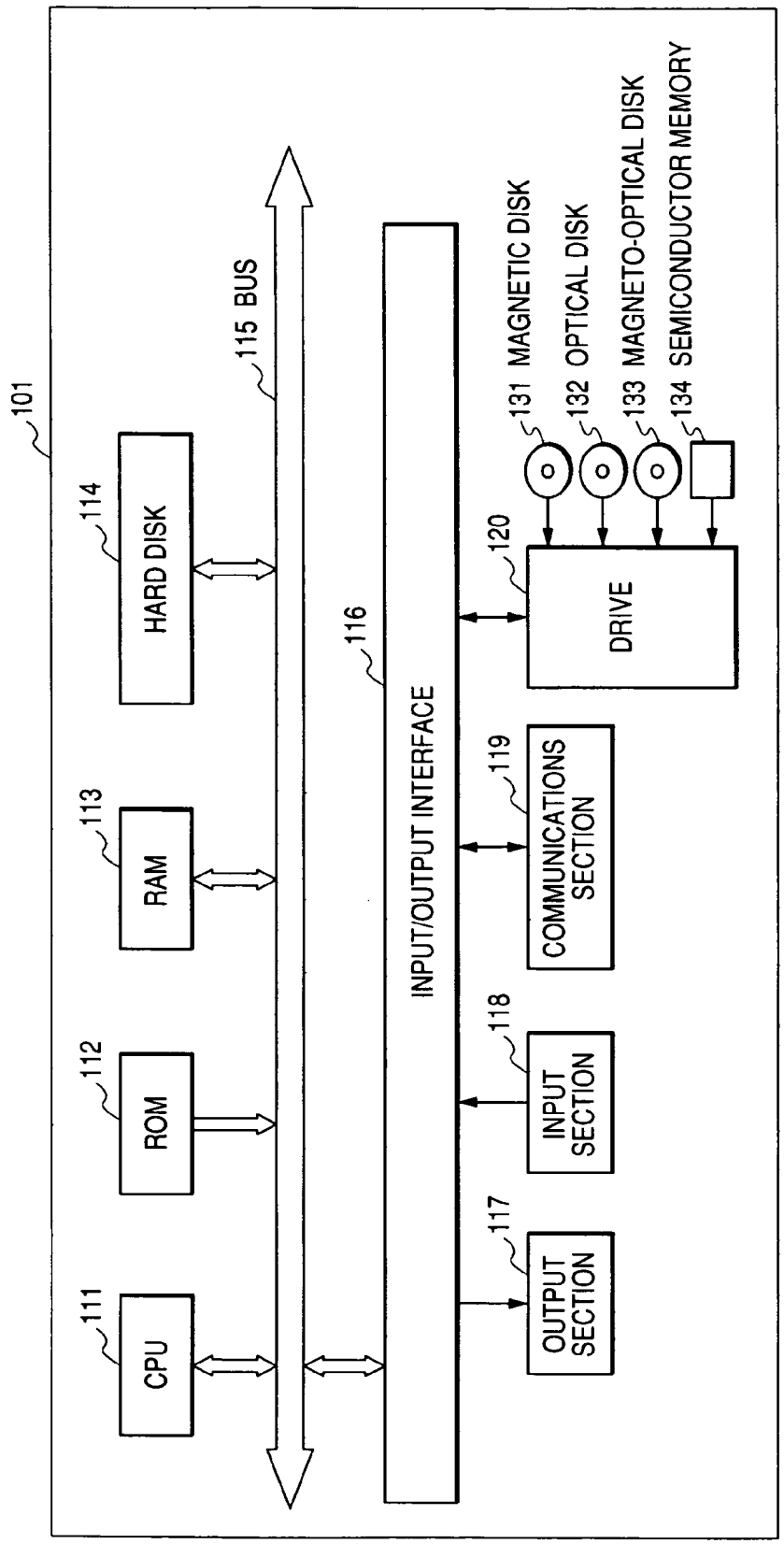
FIG. 35 is a block diagram showing an exemplary structure of a personal computer.

FIG. 35 is a block diagram showing an exemplary structure of a computer 101 functioning as the receiver 3 described above. In the computer 101, a CPU 111 is connected with an input/output interface 116 via a bus 115. The CPU 111 loads a program for execution responding to a user's command coming from an input section 118 over the input/output interface 116. The input section 118 is exemplified by a keyboard, a mouse, and others. The program to be loaded is previously stored in a recording medium exemplified by a magnetic disk 131, an optical disk 132, a magneto-optical disk 133, or semiconductor memory 134 to be attached to ROM 112, a hard disk 114, or a drive 120. Through such program loading, the above-described various processes are executed. The CPU 111 outputs, if required, the process result to a display section 117 exemplified by an LCD (Liquid Crystal Display) over the input/output interface 116. Here, the program may be previously stored in the hard disk 114 or the ROM 112 to provide to the user together with the computer 101, to provide as package media such as the magnetic disk 131, the optical disk 132, the magneto-optical disk 133, and the semiconductor memory 134, or to provide to the hard disk 114 from satellites, networks, and others via a communications section 119.

Note here that, in this specification, steps of a program provided by recording media surely include processes to be executed in the described order on the time series. Even if the processes are not processed on the time series, the processes to be executed simultaneously or separately are also included.

What is claimed is:

1. An image processing unit for displaying display data according to a display format, the unit comprising:
    means for displaying a first portion of display data on a display screen, the first portion of the display data being of a size smaller than a total amount of data available for display;
    means for receiving a request to move a cursor on the display screen in a specified direction beyond the first portion of the display data;
    means for determining whether a second portion of display data exists in the specified direction that is currently not displayed on the display screen;
    means for displaying a display option to be selected in response to determining that the second portion of display data exists in the specified direction, the display option allowing selection of a quantity of blocks of the second portion of display data to display; and
    means for reconfiguring, after selecting the display option, the display screen to include the selected quantity of the second portion of the display data.

2. The image processing unit according to claim 1, wherein the display data is an electronic program guide composed of blocks each designated for a predetermined section.

3. The image processing unit according to claim 2, wherein the section indicates channel number, broadcasting station name, broadcasting time, date and time, or category.

4. The image processing unit according to claim 1, wherein the display option is changed in display color when selected.

5. The image processing unit according to claim 1, wherein the display option is flashed when selected.

6. An image processing method for displaying display data according to a display format, the method comprising:
    displaying a first portion of display data on a display screen, the first portion of the display data being of a size smaller than a total amount of data available for display;
    receiving a request to move a cursor on the display screen in a specified direction beyond the first portion of the display data;
    determining whether a second portion of display data exists in the specified direction that is currently not displayed on the display screen;
    displaying a display option to be selected in response to determining that the second portion of display data exists in the specified direction, the display option allowing selection of a quantity of blocks of the second portion of display data to display; and
    reconfiguring, after selecting the display option, the display data to include the selected quantity of the second portion of the display data.

7. A computer-readable recording medium storing a computer-executable program which, when executed by a processor, performs a method for displaying display data according to a display format, the method comprising:
    displaying a first portion of display data on a display screen, the first portion of the display data being of a size smaller than a total amount of data available for display;
    receiving a request to move a cursor on the display screen in a specified direction beyond the first portion of the display data;
    determining whether a second portion of display data exists in the specified direction that is currently not displayed on the display screen;
    displaying a display option to be selected in response to determining that the second portion of display data exists in the specified direction, the display option allowing selection of a quantity of blocks of the second portion of display data to display; and
    reconfiguring, after selecting the display option, the display data to include the selected quantity of the second portion of the display data.

* * * * *